(12) United States Patent
Okuzawa et al.

(10) Patent No.: US 12,084,572 B2
(45) Date of Patent: Sep. 10, 2024

(54) IMPELLER AND RESIN COMPOSITION THEREFOR

(71) Applicant: TEIJIN LIMITED, Osaka (JP)

(72) Inventors: Shunsuke Okuzawa, Osaka (JP); Masatsugu Furuki, Osaka (JP); Seiji Kikuchi, Osaka (JP); Tadayoshi Tsukeda, Kyoto (JP); Saki Aso, Kyoto (JP); Koichi Iwata, Kyoto (JP)

(73) Assignee: TEIJIN LIMITED, Osaka (JP)

( * ) Notice: Subject to any disclaimer, the term of this patent is extended or adjusted under 35 U.S.C. 154(b) by 556 days.

(21) Appl. No.: 17/438,723

(22) PCT Filed: Mar. 10, 2020

(86) PCT No.: PCT/JP2020/010374
§ 371 (c)(1),
(2) Date: Sep. 13, 2021

(87) PCT Pub. No.: WO2020/184577
PCT Pub. Date: Sep. 17, 2020

(65) Prior Publication Data
US 2022/0127455 A1    Apr. 28, 2022

(30) Foreign Application Priority Data
Mar. 14, 2019    (JP) .................................. 2019-047259

(51) Int. Cl.
*C08L 69/00*    (2006.01)
*C08K 3/04*    (2006.01)
(Continued)

(52) U.S. Cl.
CPC ............... *C08L 69/00* (2013.01); *C08K 3/04* (2013.01); *C08K 3/40* (2013.01); *C08K 5/49* (2013.01);
(Continued)

(58) Field of Classification Search
CPC ...... F01D 5/282; F04D 29/023; F04D 29/026; C08L 2205/03; C08L 69/00; C08L 63/00;
(Continued)

(56) References Cited

U.S. PATENT DOCUMENTS 6,043,310 A    3/2000 Liu et al.
6,043,610 A    3/2000 Liu et al.
(Continued)

FOREIGN PATENT DOCUMENTS

JP    57-119105    7/1982
JP    7-331051    12/1995
(Continued)

OTHER PUBLICATIONS

International Search Report issued May 26, 2020 in International (PCT) Application No. PCT/JP2020/010374.

*Primary Examiner* — David J Buttner
*Assistant Examiner* — Surbhi M Du
(74) *Attorney, Agent, or Firm* — Wenderoth, Lind & Ponack, L.L.P.

(57) ABSTRACT

The present invention provides an impeller formed from a resin composition having high tensile strength and specific strength in a high-temperature environment, and having high dimensional accuracy and excellent fire resistance. The impeller according to the present invention is formed from a resin composition containing (A) an aromatic polycarbonate-based resin (component A) and (B) a liquid crystal polyester resin (component B), and containing, on the basis of a total of 100 parts by weight of component A and component B, (C) 3-40 parts by weight of a halogenated carbonate compound (component C), (D) 0.1-3 parts by weight of a drip inhibitor (component D), (E) 25-150 parts by weight of glass fibers and/or carbon fibers (component E), (F) 0.1-8 parts by weight of an epoxy resin (component
(Continued)

F), and (G) 0.01-3 parts by weight of a phosphorus-based stabilizer (component G), wherein the weight ratio of component A and component B [(A)/(B)] is 98/2 to 60/40.

8 Claims, 1 Drawing Sheet

(51) Int. Cl.
    *C08K 3/40*     (2006.01)
    *C08K 5/49*     (2006.01)
    *C08K 7/14*     (2006.01)
    *C08L 27/18*     (2006.01)
    *C08L 63/00*     (2006.01)
    *C08L 67/00*     (2006.01)
    *F01D 5/28*     (2006.01)
    *F04D 29/02*     (2006.01)
    *F04D 29/32*     (2006.01)

(52) U.S. Cl.
    CPC ............... *C08K 7/14* (2013.01); *C08L 27/18* (2013.01); *C08L 63/00* (2013.01); *C08L 67/00* (2013.01); *F01D 5/282* (2013.01); *F04D 29/023* (2013.01); *F04D 29/026* (2013.01); *F04D 29/325* (2013.01); *C08L 2205/03* (2013.01); *F05D 2220/30* (2013.01); *F05D 2240/30* (2013.01); *F05D 2300/603* (2013.01)

(58) Field of Classification Search
    CPC ...... C08L 67/00; C08L 27/18; F05D 2220/30; C08K 7/06

See application file for complete search history.

(56) References Cited

U.S. PATENT DOCUMENTS

| 10,196,515 | B2 | 2/2019 | Hayashida |
| 2006/0074154 | A1 | 4/2006 | Harashina et al. |
| 2016/0024301 | A1 | 1/2016 | Hayashida |

FOREIGN PATENT DOCUMENTS

| JP | 8-4688 | 1/1996 |
| JP | 2000-239543 | 9/2000 |
| JP | 2002-80274 | 3/2002 |
| JP | 2004/061008 | 7/2004 |
| JP | 2004-210882 | 7/2004 |
| JP | 2008-163315 | 7/2008 |
| JP | 2009-235422 | 10/2009 |
| JP | 2009-292953 | 12/2009 |
| JP | 2012-188578 | 10/2012 |
| JP | 2013-209629 | 10/2013 |
| JP | 2015-59138 | 3/2015 |
| JP | 6195904 | 9/2017 |

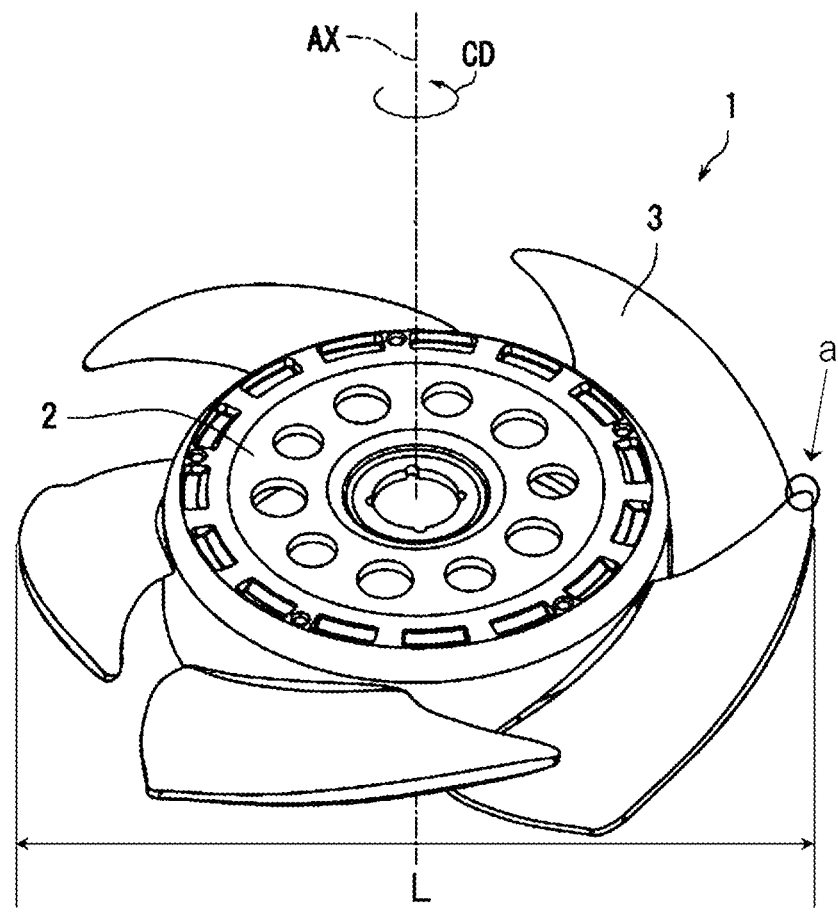

IMPELLER AND RESIN COMPOSITION THEREFOR

FIELD

The present invention relates to an impeller made of a resin composition comprising a resin component composed of a polycarbonate-based resin and a liquid crystal polyester resin in a specific ratio, a halogenated carbonate compound, a dripping inhibitor, a glass fiber and/or a carbon fiber, an epoxy resin, and a phosphorus-based stabilizer.

BACKGROUND

An impeller means an impeller used in centrifugal pumps for liquid or gaseous fluids, generators, etc., and provides energy in the form of pressure and velocity to the fluid that passes through the impeller under the output of the prime mover. An impeller made of a single metal component has hitherto been known. However, this metal impeller has a problem that it is heavy in weight, and also has a problem that it is difficult to form subtle curved surfaces with metal.

Therefore, a resin impeller molded using a resin has been developed. There have been used, as the resin impeller, resin impellers made of fiber-reinforced resins such as a carbon fiber-reinforced polyether ether ketone resin (PEEK) and a glass fiber-reinforced polyphenylene sulfide resin (PPS).

In recent years, the impeller is often used in a high-temperature and high-speed rotation environment, and a resin material is required to have high specific strength together with tensile strength in a high-temperature environment. Carbon fiber-reinforced PEEK is excellent in tensile strength and specific strength at high temperature, but is currently a rather expensive material. In some cases, a glass-reinforced PPS resin is used, but since a PPS resin has a glass transition temperature (Tg) of about 90° C., there is a problem of strength reduction in the operating environment near Tg, thus requiring a resin impeller with a good balance between material price and performance.

A polycarbonate resin is a resin having excellent heat resistance, impact resistance, dimensional stability, etc., and is widely used in the fields of electrical/electronic components, mechanical components, automobile components, OA equipment components, etc. Although methods of using the polycarbonate resin as a resin material for impellers have been disclosed, impellers with sufficient properties such as tensile strength, specific strength, dimensional accuracy, and flame resistance have not yet been obtained (see Patent Literatures 1 and 2).

There have been known, as a method for improving the tensile strength of a polycarbonate resin, techniques in which the strength is improved by adding a component for improving the adhesion with a filler to a glass fiber- or carbon fiber-reinforced polycarbonate resin (see Patent Literatures 3 and 4). There has also been known a method in which a glass fiber is mixed with an alloy of a polycarbonate resin and a liquid crystal polyester to further improve the tensile strength (Patent Literature 5). However, neither of them has achieved both sufficient tensile strength and specific strength in a high-temperature environment at higher than 80° C. In flame retardant formulations, there has been reported the achievement of flame retardancy using a phosphate ester-based flame retardant, a metal salt-based flame retardant, and brominated epoxy carbonate, but it was difficult to impart the flame retardancy in a situation where properties such as sufficient heat resistance, strength, and dimensional accuracy are well balanced (see Patent Literatures 6 and 7).

CITATION LIST

Patent Literature

[PTL 1] JPS 57-119105 A
[PTL 2] JPH 8-4688 A
[PTL 3] JP 2009-292953 A
[PTL 4] JP 6195904 B1
[PTL 5] JP 2012-188578 A
[PTL 6] JPH 7-331051 A
[PTL 7] JP 2008-163315 A

SUMMARY

Technical Problem

In view of the above, an object of the present invention is to provide an impeller made of a polycarbonate resin composition having excellent dimensional accuracy and flame retardancy, in addition to excellent tensile strength and high specific strength in a high-temperature environment.

Solution to Problem

As a result of intensive studies to solve the above problems, the present inventors have found a method in which an impeller made of a polycarbonate resin composition having excellent dimensional accuracy and flame retardancy, in addition to excellent tensile strength and high specific strength in a high-temperature environment is obtained by mixing a component composed of a polycarbonate-based resin and a liquid crystal polyester resin in a specific ratio with a halogenated carbonate compound, a dripping inhibitor, a glass fiber and/or a carbon fiber, an epoxy resin, and a phosphorus-based stabilizer, thus completing the present invention.

The present inventors have found that the above problems can be solved by the present invention including the following aspects.

Aspect 1

An impeller made of a resin composition including: (A) a polycarbonate-based resin (component A), (B) a liquid crystal polyester resin (component B), and based on 100 parts by weight of the total amount of the component A and the component B: (C) 3 to 40 parts by weight of a halogenated carbonate compound (component C), (D) 0.1 to 3 parts by weight of a dripping inhibitor (component D), (E) 25 to 150 parts by weight of a glass fiber and/or a carbon fiber (component E), (F) 0.1 to 8 parts by weight of an epoxy resin (component F), and (G) 0.01 to 3 parts by weight of a phosphorus-based stabilizer (component G), wherein a weight ratio of the component A to the component B [(A)/(B)] is 98/2 to 60/40.

Aspect 2

The impeller according to aspect 1, wherein the component A has a viscosity-average molecular weight of $1.7 \times 10^4$ to $2.1 \times 10^4$.

Aspect 3

The impeller according to aspect 1 or 2, wherein the component B is a liquid crystal polyester resin including a repeating unit derived from p-hydroxybenzoic acid and a repeating unit derived from 6-hydroxy-2-naphthoic acid.

Aspect 4

The impeller according to any one of aspects 1 to 3, wherein the component E is a glass fiber having a flat cross-section in which an average value of a major axis of a cross-section of the fiber is 10 to 50 μm and an average value of a ratio of the major axis to a minor axis (major axis/minor axis) is 1.5 to 8.

Aspect 5

The impeller according to any one of aspects 1 to 4, wherein the component F is a bisphenol A type epoxy resin.

Aspect 6

The impeller according to any one of aspects 1 to 5, wherein a dimensional change rate in the vertical direction of a blade tip to a diameter after being rotated at 12,000 rpm for 10 days in an atmosphere at 85° C. is 0.4% or less.

Aspect 7

The impeller according to any one of aspects 1 to 6, which is used as an impeller for cooling, ventilation, air conditioning fan of home appliances, OA equipment, and industrial equipment, and vehicle air conditioning, and blower fan.

Aspect 8

A resin composition including:
(A) an aromatic polycarbonate-based resin (component A),
(B) a liquid crystal polyester resin (component B), and based on 100 parts by weight of the total amount of the component A and the component B:
(C) 3 to 40 parts by weight of a halogenated carbonate compound (component C),
(D) 0.1 to 3 parts by weight of a dripping inhibitor (component D),
(E) 25 to 150 parts by weight of a glass fiber and/or a carbon fiber (component E),
(F) 0.1 to 8 parts by weight of an epoxy resin (component F), and
(G) 0.01 to 3 parts by weight of a phosphorus-based stabilizer (component G), wherein a weight ratio of the component A to the component B [(A)/(B)] is 98/2 to 60/40.

Advantageous Effects of Invention

The impeller of the present invention has high tensile strength, specific strength, dimensional accuracy, and flame retardancy in a high-temperature environment, and these properties are not found in the prior art. Therefore, the industrial effect of the present invention is extremely significant.

BRIEF DESCRIPTION OF DRAWINGS

FIG. 1 is a schematic view of an impeller used for the evaluation in Examples.

DESCRIPTION OF EMBODIMENTS

The details of the present invention will be described below.

The impeller of the present invention is made of a resin composition including:
(A) an aromatic polycarbonate-based resin (component A),
(B) a liquid crystal polyester resin (component B), and based on 100 parts by weight of the total amount of the component A and the component B:
(C) 3 to 40 parts by weight of a halogenated carbonate compound (component C),
(D) 0.1 to 3 parts by weight of a dripping inhibitor (component D),
(E) 25 to 150 parts by weight of a glass fiber and/or a carbon fiber (component E),
(F) 0.1 to 8 parts by weight of an epoxy resin (component F), and
(G) 0.01 to 3 parts by weight of a phosphorus-based stabilizer (component G), wherein a weight ratio of the component A to the component B [(A)/(B)] is 98/2 to 60/40.

(Component A: Polycarbonate-Based Resin)

The polycarbonate-based resin used as the component A in the present invention is obtained by reacting a dihydric phenol with a carbonate precursor. Examples of the reaction method include an interfacial polymerization method, a melt transesterification method, a solid phase transesterification method of a carbonate prepolymer, and a ring-opening polymerization method of a cyclic carbonate compound.

Typical examples of the dihydric phenol used herein include hydroquinone, resorcinol, 4,4'-biphenol, 1,1-bis(4-hydroxyphenyl)ethane, 2,2-bis(4-hydroxyphenyl)propane (commonly known as bisphenol A), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, bis(4-hydroxy-3-methylphenyl)sulfide, 9,9-bis(4-hydroxyphenyl)fluorene, and 9,9-bis(4-hydroxy-3-methylphenyl)fluorene. A preferred dihydric phenol is bis(4-hydroxyphenyl)alkane. Of these dihydric phenols, bisphenol A is particularly preferable in view of impact resistance, and is widely used.

In the present invention, it is possible to use, as the component A, a special polycarbonate produced by using other dihydric phenols, in addition to a bisphenol A-based polycarbonate which is a widely-used polycarbonate.

For example, a polycarbonate (a homopolymer or a copolymer) using, as a part or all of the dihydric phenol component, 4,4'-(m-phenylenediisopropylidene)diphenol (hereinafter sometimes abbreviated as "BPM"), 1,1-bis(4-hydroxyphenyl)cyclohexane, 1,1-bis(4-hydroxyphenyl)-3,3,5-trimethylcyclohexane (hereinafter sometimes abbreviated as "Bis-TMC"), 9,9-bis(4-hydroxyphenyl)fluorene and 9,9-bis(4-hydroxy-3-methylphenyl)fluorene (hereinafter sometimes abbreviated as "BCF") is suitable for applications with particularly stringent requirements for dimensional change due to water absorption and morphological stability. It is preferable to use these dihydric phenols other than BPA in an amount of 5 mol % or more, and particularly 10 mol % or more, of the total dihydric phenol components constituting the polycarbonate.

In particular, when high rigidity and more satisfactory hydrolysis resistance are required, it is particularly preferable that the component A constituting the resin composition is the following copolymer polycarbonates (1) to (3):
  (1) Copolymer polycarbonate in which the content of BPM is 20 to 80 mol % (more preferably 40 to 75 mol %, and still more preferably 45 to 65 mol %) and the content of BCF is 20 to 80 mol % (more preferably 25 to 60 mol %, and still more preferably 35 to 55 mol %) in 100 mol % of the dihydric phenol component constituting the polycarbonate.
  (2) Copolymer polycarbonate in which the content of BPA is 10 to 95 mol % (more preferably 50 to 90 mol %, and still more preferably 60 to 85 mol %) and the content of BCF is 5 to 90 mol % (more preferably 10 to 50 mol %, and still more preferably 15 to 40 mol %), in 100 mol % of the dihydric phenol component constituting the polycarbonate.
  (3) Copolymer polycarbonate in which the content of BPM is 20 to 80 mol % (more preferably 40 to 75 mol %, and still more preferably 45 to 65 mol %) and the content of Bis-TMC is 20 to 80 mol % (more preferably 25 to 60 mol %, and still more preferably 35 to 55 mol %) in 100 mol % of the dihydric phenol component constituting the polycarbonate.

These special polycarbonates may be used alone, or in admixture of two or more thereof. They may also be used in admixture with a widely-used bisphenol A polycarbonate.

The production methods and properties of these special polycarbonates are mentioned in detail, for example, in JPH 6-172508 A, JPH 8-27370 A, JP 2001-55435 A, and JP 2002-117580 A.

Of various polycarbonates mentioned above, polycarbonates having water absorption rate and glass transition temperature (Tg) controlled within the following ranges by adjusting the copolymerization composition have satisfactory hydrolysis resistance of the polymer itself and are remarkably excellent in low warpage after molding, and are therefore particularly suitable in the fields where the morphological stability is required.
  (i) Polycarbonate having a water absorption rate of 0.05 to 0.15%, and preferably 0.06 to 0.13%, and Tg of 120 to 180° C., or
  (ii) Polycarbonate having Tg of 160 to 250° C., and preferably 170 to 230° C., and a water absorption rate of 0.10 to 0.30%, preferably 0.13 to 0.30%, and still more preferably 0.14 to 0.27%.

Here, the water absorption rate of the polycarbonate is a value obtained by measuring the water content after immersing in water at 23° C. for 24 hours in accordance with ISO 62-1980 using a disk-shaped test piece having a diameter of 45 mm and a thickness of 3.0 mm. The glass transition temperature (Tg) is a value obtained by differential scanning calorimetry (DSC) measurement in accordance with JIS K7121.

As a carbonate precursor, a carbonyl halide, a carbonic acid diester, or a haloformate is used, and specific examples thereof include phosgene, diphenyl carbonate, or a dihaloformate of a dihydric phenol.

For the production of an aromatic polycarbonate resin by interfacial polymerization of the dihydric phenol and the carbonate precursor and, if necessary, a catalyst, an end terminator, an antioxidant for preventing the dihydric phenol from being oxidized, etc. may be used. The aromatic polycarbonate resin of the present invention includes a branched polycarbonate resin obtained by copolymerizing a trifunctional or higher polyfunctional aromatic compound, a polyester carbonate resin obtained by copolymerizing an aromatic or aliphatic (including alicyclic) difunctional carboxylic acid, a copolymer polycarbonate resin obtained by copolymerizing a difunctional alcohol (including alicyclic), and a polyester carbonate resin obtained by copolymerizing both the difunctional carboxylic acid and the difunctional alcohol. Further, it may be a mixture of two or more of the thus obtained aromatic polycarbonate resins.

The branched polycarbonate resin can impart dripping inhibiting performance to the resin composition of the present invention. Examples of the trifunctional or higher polyfunctional aromatic compound used in the branched polycarbonate resin include phloroglucin, phloroglucide, or trisphenol such as 4,6-dimethyl-2,4,6-tris(4-hydroxyphenyl)heptene-2,2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol or 4-{4-[1,1-bis(4-hydroxyphenyl)ethyl]benzene}-α,α-dimethylbenzylphenol, tetra(4-hydroxyphenyl)methane, bis(2,4-di hydroxyphenyl)ketone, 1,4-bis(4,4-dihydroxytriphenylmethyl)benzene, or trimellitic acid, pyromellitic acid, benzophenonetetracarboxylic acid, and acid chlorides thereof. Of these, 1,1,1-tris(4-hydroxyphenyl)ethane and 1,1,1-tris(3,5-dimethyl-4-hydroxyphenyl)ethane are preferable, and 1,1,1-tris(4-hydroxyphenyl)ethane is particularly preferable.

The content of the constituent unit derived from the polyfunctional aromatic compound in the branched polycarbonate is preferably 0.01 to 1 mol %, more preferably 0.05 to 0.9 mol %, and still more preferably 0.05 to 0.8 mol %, in 100 mol % of the total amount of the constituent unit derived from the dihydric phenol and the constituent unit derived from the polyfunctional aromatic compound.

Particularly in the case of the melt transesterification method, a branched structural unit may be generated as a side reaction, and the amount of the branched structural unit is preferably 0.001 to 1 mol %, more preferably 0.005 to 0.9 mol %, and still more preferably 0.01 to 0.8 mol %, in 100 mol % of the total amount with the structural unit derived from a dihydric phenol. The amount of the branched structure can be calculated by $^1$H-NMR measurement.

The aliphatic difunctional carboxylic acid is preferably α,ω-dicarboxylic acid. Examples of the aliphatic difunctional carboxylic acid are preferably linear saturated aliphatic dicarboxylic acids such as sebacic acid (decanedioic acid), dodecanedioic acid, tetradecanedioic acid, octadecanedioic acid; and alicyclic dicarboxylic acid such as cyclohexanedicarboxylic acid. The difunctional alcohol is more preferably an alicyclic diol, and examples thereof include cyclohexanedimethanol, cyclohexanediol, and tricyclodecanedimethanol.

Reaction modes such as interfacial polymerization method, melt transesterification method, carbonate prepolymer solid phase transesterification method, and ring-opening polymerization method of a cyclic carbonate compound, which are methods for producing a polycarbonate-based resin, are methods well known in various literatures and patent publications.

For the production of the resin composition of the present invention, the viscosity-average molecular weight (M) of the polycarbonate resin is not particularly limited, but is preferably $1\times10^4$ to $5\times10^4$, more preferably $1.4\times10^4$ to $3\times10^4$, still more preferably $1.4\times10^4$ to $2.4\times10^4$, and particularly preferably $1.7\times10^4$ to $2.1\times10^4$. A polycarbonate-based resin having a viscosity-average molecular weight of less than $1\times10^4$ may not have satisfactory mechanical properties, particularly high tensile strength. Meanwhile, a resin composition obtained from an aromatic polycarbonate-based resin having a viscosity-average molecular weight of more than $5×10^4$ is inferior in versatility in view of inferior fluidity during injection molding.

The polycarbonate-based resin may be obtained by mixing those having a viscosity-average molecular weight outside the above range. In particular, a polycarbonate-based resin having a viscosity-average molecular weight of more than the above range ($5×10^4$) has improved entropy elasticity of the resin. As a result, satisfactory moldability is exhibited in gas-assisted molding and foam molding, which may be used when molding a reinforced resin material into a structural member. Such improvement in moldability is better than that of the branched polycarbonate. It is also possible to use, as more preferred embodiment, a polycarbonate-based resin (component A-1), in which a component A is composed of a polycarbonate-based resin having a viscosity-average molecular weight of $7×10^4$ to $3×10^5$ (component A-1-1) and an aromatic polycarbonate resin having a viscosity-average molecular weight of $1×10^4$ to $3×10^4$ (component A-1-2), and the viscosity-average molecular weight thereof is $1.6×10^4$ to $3.5×10^4$ (hereinafter sometimes referred to as "high-molecular weight component-containing polycarbonate-based resin").

In such high-molecular weight component-based polycarbonate-based resin (component A-1), the molecular weight of the component A-1-1 is preferably $7×10^4$ to $2×10^5$, more preferably $8×10^4$ to $2×10^5$, still more preferably $1×10^5$ to $2×10^5$, and particularly preferably $1×10^5$ to $1.6×10^5$. The molecular weight of the component A-1-2 is preferably $1×10^4$ to $2.5×10^4$, more preferably $1.1×10^4$ to $2.4×10^4$, still more preferably $1.2×10^4$ to $2.4×10^4$, and particularly preferably $1.2×10^4$ to $2.3×10^4$.

The high-molecular weight component-based polycarbonate-based resin (component A-1) can be obtained by mixing the component A-1-1 with the component A-1-2 in various ratios and adjusting so as to satisfy a predetermined molecular weight range. In 100% by weight of the component A-1, the amount of the component A-1-1 is preferably 2 to 40% by weight, the amount of the component A-1-1 is more preferably 3 to 30% by weight, the amount of the component A-1-1 is still more preferably 4 to 20% by weight, and the amount of the component A-1-1 is particularly preferably 5 to 20% by weight.

Examples of the method for preparing a component A-1 include (1) a method in which the component A-1-1 component and the component A-1-2 are each independently polymerized, followed by mixing; (2) a method for producing an aromatic polycarbonate resin so as to satisfy the conditions of the component A-1 of the present invention, using a method in which an aromatic polycarbonate resin showing a plurality of polymer peaks in a molecular weight distribution chart by the GPC method, which is typified by the method shown in JP 5-306336 A; and (3) a method in which the aromatic polycarbonate resin obtained by the such production method (the production method (2)) is mixed with the component A-1-1 and/or the component A-1-2 produced separately.

The viscosity-average molecular weight in the present invention is obtained in the following manner. First, specific viscosity ($\eta_{SP}$) calculated by the following equation is determined from a solution prepared by dissolving 0.7 g of polycarbonate in 100 ml of methylene chloride at 20° C. using an Ostwald viscometer:

Specific viscosity $(\eta_{SP})=(t-t_0)/t_0$ where $t_0$ is the falling seconds for methylene chloride, and t is the falling seconds for the sample solution.

The viscosity-average molecular weight M is calculated from the thus obtained specific viscosity ($\eta_{SP}$) by the following equations.

$\eta_{SP}/c=[\eta]+0.45×[\eta]^2c$ ([η] is limiting viscosity)

$[\eta]=1.23×10^{-4}M^{0.83}$ $c=0.7$

The viscosity-average molecular weight of the polycarbonate-based resin is calculated in the following manner. Namely, the composition is mixed with 20 to 30 times the weight of methylene chloride to dissolve the soluble component in the composition. Such soluble component is collected by filtration through Celite. The solvent in the resulting solution is then removed. After removal of the solvent, a solid is sufficiently dried to obtain a solid of a component which dissolves in methylene chloride. From a solution prepared by dissolving 0.7 g of the solid in 100 ml of methylene chloride, the specific viscosity at 20° C. is obtained in the same manner as mentioned above, and the viscosity-average molecular weight M is calculated from the specific viscosity in the same manner as mentioned above.

It is also possible to use, as the polycarbonate-based resin (component A), a polycarbonate-polydiorganosiloxane copolymer resin. The polycarbonate-polydiorganosiloxane copolymer resin is a copolymer resin prepared by copolymerizing a dihydric phenol from which a constituent unit represented by the following general formula (1) is derived, with a hydroxyaryl-terminated polydiorganosiloxane from which a constituent unit represented by the following general formula (3) is derived:

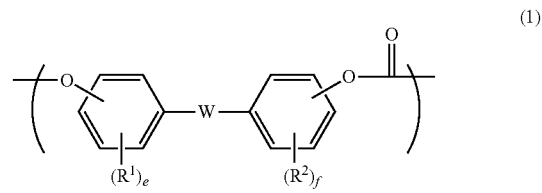

(1)

wherein, in the general formula (1), $R^1$ and $R^2$ each independently represent a group selected from the group consisting of a hydrogen atom, a halogen atom, an alkyl group having 1 to 18 carbon atoms, an alkoxy group having 1 to 18 carbon atoms, a cycloalkyl group having 6 to 20 carbon atoms, a cycloalkoxy group having 6 to 20 carbon atoms, an alkenyl group having 2 to 10 carbon atoms, an aryl group having 6 to 14 carbon atoms, an aryloxy group having 6 to 14 carbon atoms, an aralkyl group having 7 to 20 carbon atoms, an aralkyloxy group having 7 to 20 carbon atoms, a nitro group, an aldehyde group, a cyano group, and a carboxyl group, and when there are a plurality of substituents, they may be the same or different; e and f are each an integer of 1 to 4; and W is a single bond, or at least one group selected from the group consisting of groups represented by the following general formula (2):

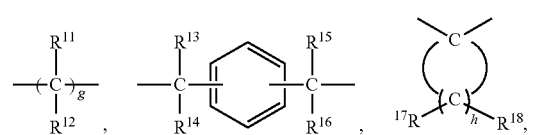

(2)

-continued

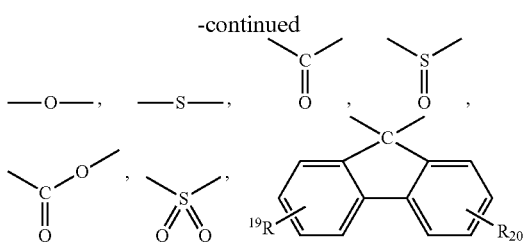

wherein, in the general formula (2), $R^{11}$, $R^{12}$, $R^{13}$, $R^{14}$, $R^{15}$, $R^{16}$, $R^{17}$, and $R^{18}$ each independently represent a group selected from the group consisting of a hydrogen atom, an alkyl group having 1 to 18 carbon atoms, an aryl group having 6 to 14 carbon atoms, and an aralkyl group having 7 to 20 carbon atoms; $R^{19}$ and $R^{20}$ each independently represent a group selected from the group consisting of a hydrogen atom, a halogen atom, an alkyl group having 1 to 18 carbon atoms, an alkoxy group having 1 to 10 carbon atoms, a cycloalkyl group having 6 to 20 carbon atoms, a cycloalkoxy group having 6 to 20 carbon atoms, an alkenyl group having 2 to 10 carbon atoms, an aryl group having 6 to 14 carbon atoms, an aryloxy group having 6 to 10 carbon atoms, an aralkyl group having 7 to 20 carbon atoms, an aralkyloxy group having 7 to 20 carbon atoms, a nitro group, an aldehyde group, a cyano group, and a carboxyl group, and when there are a plurality of substituents, they may be the same or different; g is an integer of 1 to 10; and h is an integer of 4 to 7, and

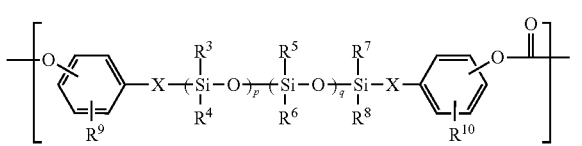

(3)

wherein, in the general formula (3), $R^3$, $R^4$, $R^5$, $R^6$, $R^7$, and $R^8$ are each independently a hydrogen atom, an alkyl group having 1 to 12 carbon atoms, or a substituted or unsubstituted aryl group having 6 to 12 carbon atoms; $R^9$ and $R^{10}$ are each independently a hydrogen atom, a halogen atom, an alkyl group having 1 to 10 carbon atoms, or an alkoxy group having 1 to 10 carbon atoms; p is a natural number; q is 0 or a natural number; p q is a natural number of 10 to 300; and X is a divalent aliphatic group having 2 to 8 carbon atoms.

Examples of the dihydric phenol (I) from which a constituent unit represented by the general formula (1) is derived include 4,4'-dihydroxybiphenyl, bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)-3,3,5-trimethylcyclohexane, 2,2-bis(4-hydroxy-3,3'-biphenyl)propane, 2,2-bis(4-hydroxy-3-isopropylphenyl)propane, 2,2-bis(3-t-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl)propane, 2,2-bis(3,5-dimethyl-4-hydroxyphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl)diphenylmethane, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxydiphenyl ether, 4,4'-dihydroxy-3,3'-dimethyldiphenyl ether, 4,4'-sulfonyldiphenol, 4,4'-dihydroxydiphenyl sulfoxide, 4,4'-dihydroxydiphenyl sulfide, 2,2'-dimethyl-4,4'-sulfonyldiphenol, 4,4'-dihydroxy-3,3'-dimethyldiphenyl sulfoxide, 4,4'-dihydroxy-3,3'-dimethyldiphenyl sulfide, 2,2'-diphenyl-4,4'-sulfonyldiphenol, 4,4'-dihydroxy-3,3'-diphenyldiphenyl sulfoxide, 4,4'-dihydroxy-3,3'-diphenyldiphenyl sulfide, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.02,6]decane, adamantanediyl)diphenol, and 1,3-bis(4-hydroxyphenyl)-5,7-dimethyladamantane. Of these, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3,3,5-trimethylcyclohexane, 4,4'-sulfonyldiphenol, 2,2'-dimethyl-4,4'-sulfonyldiphenol, 9,9-bis(4-hydroxy-3-methylphenyl)fluorene, 1,3-bis{2-(4-hydroxyphenyl)propyl}benzene, and 1,4-bis{2-(4-hydroxyphenyl)propyl}benzene are preferable, and 2,2-bis(4-hydroxyphenyl)propane, 1,1-bis(4-hydroxyphenyl)cyclohexane (BPZ), 4,4'-sulfonyldiphenol, and 9,9-bis(4-hydroxy-3-methylphenyl)fluorene are particularly preferable. Of these, 2,2-bis(4-hydroxyphenyl)propane having excellent strength and satisfactory durability is most preferable. These phenols may be used alone, or in combination of two or more thereof.

As the hydroxyaryl-terminated polydiorganosiloxane from which a constituent unit represented by the general formula (3) is derived, for example, compounds shown below are preferably used.

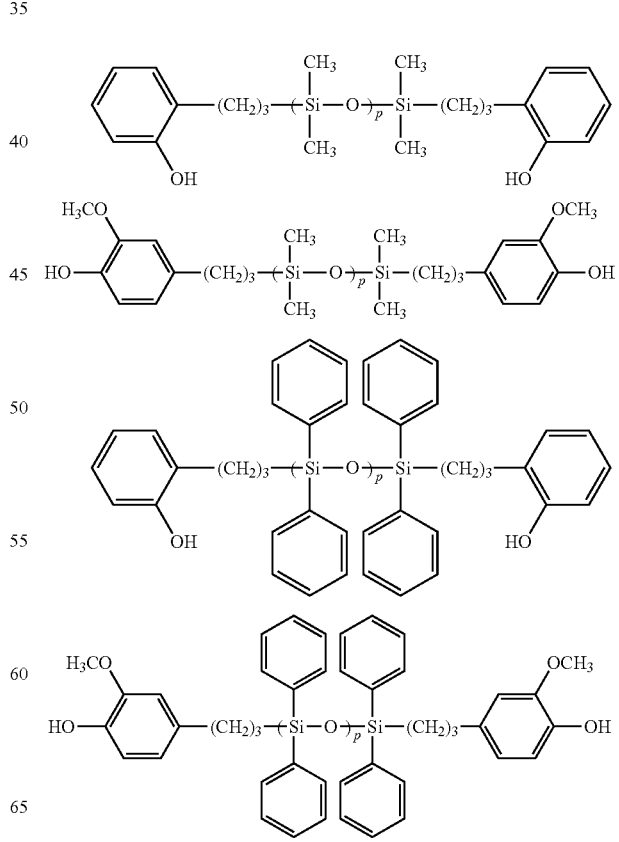

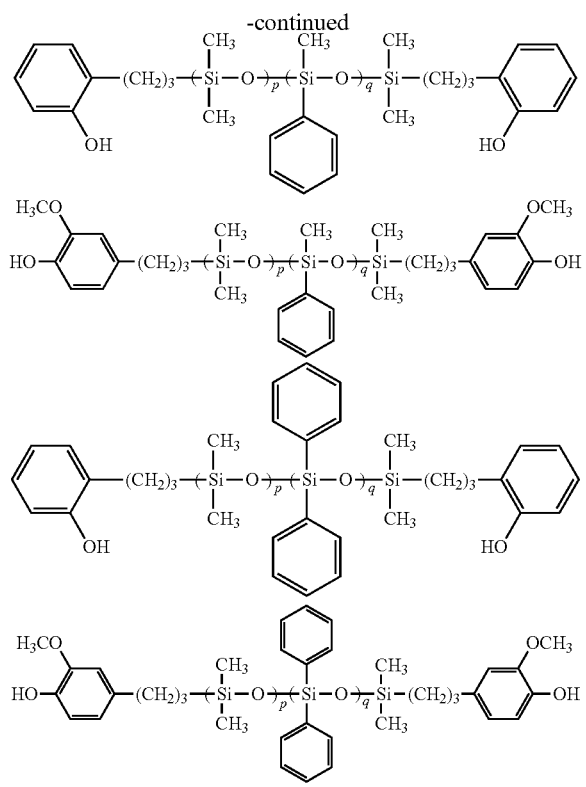

The hydroxyaryl-terminated polydiorganosiloxane (II) is easily produced by hydrosilylating a phenol having an olefinic unsaturated carbon-carbon bond, preferably vinyl phenol, 2-allylphenol, isopropenyl phenol, or 2-methoxy-4-allylphenol to the end of a polysiloxane chain having a predetermined polymerization degree. Of these, (2-allylphenol)-terminated polydiorganosiloxane and (2-methoxy-4-allylphenol)-terminated polydiorganosiloxane are preferable, and (2-allylphenol)-terminated polydimethylsiloxane and (2-methoxy-4-allylphenol)-terminated polydimethylsiloxane are particularly preferable. The hydroxyaryl-terminated polydiorganosiloxane (II) preferably has a molecular-weight distribution (Mw/Mn) of 3 or less. To develop more excellent low outgassing properties during high-temperature molding and low-temperature impact resistance, the molecular-weight distribution (Mw/Mn) is more preferably 2.5 or less, and still more preferably 2 or less. If the molecular-weight distribution exceeds the upper limit of such preferable range, a large amount of outgas may be generated during high-temperature molding and the low-temperature impact resistance may be inferior.

To realize high impact resistance, the diorganosiloxane polymerization degree (p+q) of the hydroxyaryl-terminated polydiorganosiloxane (II) is appropriately 10 to 300. The diorganosiloxane polymerization degree (p+q) is preferably 10 to 200, more preferably 12 to 150, and still more preferably 14 to 100. If the diorganosiloxane polymerization degree is less than the lower limit of the above preferable range, the impact resistance which is the feature of the polycarbonate-polydiorganosiloxane copolymer is not effectively developed, and if the diorganosiloxane polymerization degree exceeds the upper limit of the above preferable range, inferior appearance develops.

The content of the polydiorganosiloxane is preferably 0.1 to 50% by weight based on the total weight of the polycarbonate-polydiorganosiloxane copolymer resin used as the component A. The content of the polydiorganosiloxane component is more preferably 0.5 to 30% by weight, and still more preferably 1 to 20% by weight. If the content thereof is more than the lower limit of the above preferable range, the impact resistance and flame retardancy become excellent, and if the content thereof is less than the upper limit of the above preferable range, stable appearance which is hardly affected by molding conditions is easily obtained. The polymerization degree of the polydiorganosiloxane and the content of the polydiorganosiloxane can be calculated by $^1$H-NMR measurement.

In the present invention, hydroxyaryl-terminated polydiorganosiloxanes (II) may be used alone, or in combination of two or more thereof.

As long as the present invention is not impeded, a comonomer other than the dihydric phenol (I) and the hydroxyaryl-terminated polydiorganosiloxane (II) can be used in combination in an amount of 10% by weight or less based on the total weight of the copolymer.

In the present invention, a mixed solution containing an oligomer having a terminal chloroformate group is prepared in advance by a reaction between the dihydric phenol (I) and a carbonate ester-forming compound in a mixed solution of a water-insoluble organic solvent and an aqueous alkali solution.

To produce the oligomer of the dihydric phenol (I), the whole amount of the dihydric phenol (I) in use may be changed to the oligomer at a time, or a part thereof as a post-addition monomer may be added as a reaction raw material in a post-stage of an interfacial polycondensation reaction. The term "post-addition monomer" means that a monomer is added to accelerate the post-stage of the polycondensation reaction and does not need to be added when not required.

This oligomer production reaction system is not particularly limited, but is preferably a system in which the reaction is carried out in a solvent in the presence of an acid binder.

The amount of the carbonate ester-forming compound may be appropriately adjusted in consideration of the stoichiometric ratio (equivalent) of the reaction. When a gaseous carbonate ester-forming compound such as phosgene is used, it is preferably blown into the reaction system.

It is possible to use, as the acid binder, alkali metal hydroxides such as sodium hydroxide and potassium hydroxide, alkali metal carbonates such as sodium carbonate and potassium carbonate, organic bases such as pyridine, or a mixture thereof. The amount of the acid binder may be appropriately determined in consideration of the stoichiometric ratio (equivalent) of the reaction likewise. More specifically, 2 equivalents or a little more than that of the acid binder is preferably used based on the number of moles (1 mol usually corresponds to 2 equivalents) of the dihydric phenol (I) used for the formation of the oligomer.

As the solvent, solvents which are inactive to reactions such as known solvents used to produce polycarbonates may be used alone or as a mixture. Typical examples of the solvent include hydrocarbon solvents such as xylene and halogenated hydrocarbon solvents such as methylene chloride and chlorobenzene. Halogenated hydrocarbon solvents such as methylene chloride are particularly preferably used.

Although the reaction pressure for producing the oligomer is not particularly limited and may be normal pressure, increased pressure, or reduced pressure, the reaction is advantageously carried out under normal pressure. The reaction temperature is selected from a range of −20 to 50° C., and water cooling or ice cooling is desirably carried out as heat is generated by polymerization in most cases.

Although the reaction time is affected by other conditions and cannot be specified unconditionally, it is generally 0.2 to 10 hours. The pH range of the oligomer production reaction is the same as that of a known interfacial reaction and always adjusted to 10 or more.

Thus, the polycarbonate-polydiorganosiloxane copolymer is obtained by obtaining a mixed solution containing the oligomer of the dihydric phenol (I) having a terminal chloroformate group, adding the highly purified hydroxyaryl-terminated polydiorganosiloxane (II) represented by the general formula (4) having a molecular-weight distribution (Mw/Mn) of 3 or less to the dihydric phenol (I) while stirring the mixed solution, and carrying out the interfacial polycondensation of the hydroxyaryl-terminated polydiorganosiloxane (II) and the oligomer:

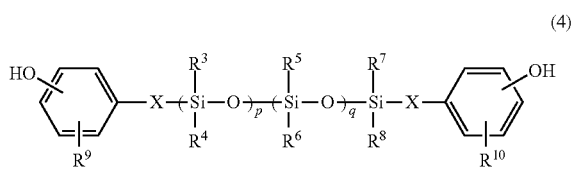

(4)

wherein, in the general formula (4), $R^3$, $R^4$, $R^5$, $R^6$, $R^7$, and $R^8$ are each independently a hydrogen atom, an alkyl group having 1 to 12 carbon atoms, or a substituted or unsubstituted aryl group having 6 to 12 carbon atoms; $R^9$ and $R^{10}$ are each independently a hydrogen atom, a halogen atom, an alkyl group having 1 to 10 carbon atoms, or an alkoxy group having 1 to 10 carbon atoms; p is a natural number, q is 0 or a natural number, and p+q is a natural number of 10 to 300; and X is a divalent aliphatic group having 2 to 8 carbon atoms.

For the interfacial polycondensation reaction, an acid binder may be appropriately added in consideration of the stoichiometric ratio (equivalent) of the reaction. It is possible to use, as the acid binder, for example, alkali metal hydroxides such as sodium hydroxide and potassium hydroxide, alkali metal carbonates such as sodium carbonate and potassium carbonate, organic bases such as pyridine, or a mixture thereof. More specifically, when the hydroxyaryl-terminated polydiorganosiloxane (II) in use or part of the dihydric phenol (I) as a post-addition monomer is added in this reaction stage, 2 equivalents or more than that of an alkali is preferably used based on the total number of moles (1 mol usually corresponds to 2 equivalents) of the post-addition dihydric phenol (I) and the hydroxyaryl-terminated polydiorganosiloxane (II).

Polycondensation by an interfacial polycondensation reaction between the oligomer of the dihydric phenol (I) and the hydroxyaryl-terminated polydiorganosiloxane (II) is carried out by vigorously stirring the above mixed solution.

In the polycondensation reaction, an end terminator or a molecular weight control agent is generally used. Examples of the end terminator include compounds having a monovalent phenolic hydroxyl group such as ordinary phenol, p-tert-butylphenol, p-cumylphenol, and tribromophenol; long-chain alkyl phenols, aliphatic carboxylic acid chlorides, aliphatic carboxylic acids, hydroxybenzoic acid alkyl esters, hydroxyphenyl alkyl acid esters, and alkyl ether phenols. The amount of the end terminator is 100 to 0.5 mol, and preferably 50 to 2 mol, based on 100 mol of the total amount of all the dihydric phenol-based compounds. Two or more of the above compounds may be used in combination as a matter of course.

To promote the polycondensation reaction, catalysts, for example, a tertiary amine such as triethylamine or a quaternary ammonium salt may be added.

The reaction time of the polycondensation reaction is preferably 30 minutes or more, and more preferably 50 minutes or more. A small amount of an antioxidant such as sodium sulfide or hydrosulfide may be added as desired.

A branching agent may be used in combination with the above dihydric phenol-based compound to obtain a branched polycarbonate-polydiorganosiloxane. Examples of the trifunctional or higher polyfunctional aromatic compound used for the branched polycarbonate-polydiorganosiloxane copolymer resin include phloroglucin, phloroglucide, or trisphenols such as 4,6-dimethyl-2,4,6-tris(4-hydroxyphenyl)heptene-2,2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol or 4-{4-[1,1-bis(4-hydroxyphenyl)ethyl]benzene}-α,α-dimethylbenzylphenol, tetra(4-hydroxyphenyl)methane, bis(2,4-dihydroxyphenyl)ketone, 1,4-bis(4,4-dihydroxytriphenylmethyl)benzene, or trimellitic acid, pyromellitic acid, benzophenonetetracarboxylic acid, and acid chlorides thereof. Of these, 1,1,1-tris(4-hydroxyphenyl)ethane and 1,1,1-tris(3,5-dimethyl-4-hydroxyphenyl)ethane are preferable, and 1,1,1-tris(4-hydroxyphenyl)ethane is particularly preferable. The amount of the polyfunctional compound in the branched polycarbonate-polydiorganosiloxane copolymer resin is preferably 0.001 to 1 mol %, more preferably 0.005 to 0.9 mol %, still more preferably 0.01 to 0.8 mol %, and particularly preferably 0.05 to 0.4 mol %, based on the whole amount of the aromatic polycarbonate-polydiorganosiloxane copolymer resin. The amount of the branched structure can be calculated by $^1$H-NMR measurement.

The reaction pressure may be reduced pressure, normal pressure, or increased pressure, but preferably normal pressure or the pressure of reaction system itself. The reaction temperature is selected from a range of −20 to 50° C., and water cooling or ice cooling is desirably carried out as heat is generated by polymerization in most cases. Since the reaction time differs according to other conditions such as the reaction temperature, it cannot be specified unconditionally, but it is usually 0.5 to 10 hours.

According to circumstances, a polycarbonate-polydiorganosiloxane copolymer resin having a desired reduced viscosity [$\eta_{SP}$/c] can be acquired by appropriately subjecting the thus obtained polycarbonate-polydiorganosiloxane copolymer resin to a physical treatment (mixing, fractionation, etc.) and/or a chemical treatment (polymer reaction, crosslinking treatment, partial decomposition treatment, etc.).

The thus obtained reaction product (crude product) is subjected to a known post-treatment such as separation and purification to collect a polycarbonate-polydiorganosiloxane copolymer resin having a desired purity (degree of purification).

The average size of polydiorganosiloxane domains in a molded article of the polycarbonate-polydiorganosiloxane copolymer resin is preferably 1 to 40 nm. The average size is more preferably 1 to 30 nm, and still more preferably 5 to 25 nm. If the average size is less than the lower limit of the preferable range, the impact resistance and flame retardancy may not be fully developed, and if the average size exceeds the upper limit of the preferable range, the impact resistance may not be developed stably.

The average domain size and normalized dispersity of the polydiorganosiloxane domains of a molded article of the polycarbonate-polydiorganosiloxane copolymer resin in the present invention were evaluated by a small-angle X-ray scattering (SAXS) method. The small-angle X-ray scattering method is a method for measuring diffuse scattering and diffraction produced in a small-angle area having a scattering angle (2θ) of less than 10°. In this small-angle X-ray scattering method, when there are areas having a size of about 1 to 100 nm and a difference in electron density in a substance, the diffuse scattering of X-rays is measured due to the electron density difference. The particle diameter of an object to be measured is obtained based on this scattering angle and scattering intensity. In the case of a polycarbonate-polydiorganosiloxane copolymer resin having an aggregation structure in which polydiorganosiloxane domains are dispersed in the matrix of a polycarbonate polymer, the diffuse scattering of X-rays occurs due to a difference in electron density between the polycarbonate matrix and the polydiorganosiloxane domains. A small-angle X-ray scattering profile is measured by measuring scattering intensity I at each scattering angle (2θ) of less than 10°, and simulation is carried out by using commercially available analyzing software from temporary particle diameter and temporary particle size distribution models based on the assumption that the polydiorganosiloxane domains are spherical domains and there are variations in particle size distribution to obtain the average size and particle size distribution (normalized dispersity) of the polydiorganosiloxane domains. According to the small-angle X-ray scattering method, the average size and particle size distribution of the polydiorganosiloxane domains dispersed in the matrix of the polycarbonate polymer, which cannot be accurately measured by observation through a transmission electron microscope, can be measured easily and accurately with high reproducibility. The term "average domain size" means the number average of individual domain sizes. The term "normalized dispersity" means a parameter obtained by normalizing the spread of a particle size distribution with the average size. Specifically, it is a value obtained by normalizing the dispersity of polydiorganosiloxane domain sizes with the average domain size and represented by the following equation (1).

$$\text{Normalized dispersity (\%)} = \delta/D_{av} \quad (1)$$

In the above equation (1), δ is the standard deviation of polydiorganosiloxane domain size, and Da, is an average domain size.

The terms "average domain size" and "normalized dispersity" as used in association with the present invention are measurement values obtained by measuring a 1.0 mm-thick part of a three-stage plate manufactured by the method mentioned in Examples by the small-angle X-ray scattering method. Analysis was carried out with an isolated particle model which does not take interaction between particles (interference between particles) into consideration.

(Component B: Liquid Crystal Polyester Resin)

The liquid crystal polyester resin used as the component B in the present invention is a thermotropic liquid crystal polyester resin, and has properties in which polymer molecular chains are arranged in a certain direction in a molten state. The form of such an arrangement state may be any of a nematic type, a smectic type, a cholesteric type, and a discotic type, and may exhibit two or more forms. Further, the structure of the liquid crystal polyester resin may be any of a main chain type, a side chain type, and a rigid main-chain/bent side-chain type, but the main chain type liquid crystal polyester resin is preferable.

The form of the arrangement state, namely, properties of the anisotropic molten phase can be confirmed by a conventional polarization inspection method using an orthogonal polarizing element. More specifically, the anisotropic molten phase can be confirmed by observing the molten sample placed on the Leitz hot stage at a magnification of 40 times in a nitrogen atmosphere using a Leiz polarizing microscope. The polymer of the present invention transmits polarized light and exhibits optically anisotropy when inspected between orthogonal polarizers, even in a molten and resting state.

The heat resistance of the liquid crystal polyester resin may be in any range, but the one that melts at a portion close to the processing temperature of the polycarbonate resin to form a liquid crystal phase is appropriate. The deflection temperature under load (ISO 75-1/2, load conditions of 1.8 Mpa) of the liquid crystal polyester is preferably 150 to 280° C., and more preferably 150 to 250° C. Such a liquid crystal polyester resin belongs to the so-called heat resistance category type 11. When having such heat resistance, the liquid crystal polyester resin is excellent in moldability as compared with type 1 having higher heat resistance, and satisfactory flame retardancy is achieved as compared with type III having lower heat resistance.

The liquid crystal polyester resin used in the present invention preferably includes a polyester unit and a polyesteramide unit, and an aromatic polyester resin and an aromatic polyesteramide resin are preferable, and a liquid polyester resin partially including an aromatic polyester unit and an aromatic polyesteramide unit in the same molecular chain is also a preferable example.

Particularly preferred is a wholly aromatic polyester resin or a wholly aromatic polyesteramide resin, which is included as a constituent unit derived from one or more compounds selected from the group consisting of an aromatic hydroxycarboxylic acid, an aromatic hydroxyamine, and an aromatic diamine. Specific examples thereof include 1) a liquid crystal polyester resin synthesized mainly from one or more compounds selected from the group consisting of an aromatic hydroxycarboxylic acid and derivatives thereof; 2) a liquid crystal polyester resin synthesized mainly from a) one or more compounds selected from the group consisting of an aromatic hydroxycarboxylic acid and derivatives thereof, b) one or more compounds selected from the group consisting of an aromatic dicarboxylic acid, an alicyclic dicarboxylic acid, and derivatives thereof, and c) one or more compounds selected from the group consisting of an aromatic diol, an alicyclic diol, an aliphatic diol, and derivatives thereof; 3) a liquid crystal polyester resin synthesized mainly from a) one or more compounds selected from the group consisting of an aromatic hydroxycarboxylic acid and derivatives thereof, b) one or more compounds selected from the group consisting of an aromatic hydroxyamine, an aromatic diamine, and derivatives thereof, and c) one or more compounds selected from the group consisting of an aromatic dicarboxylic acid, an alicyclic dicarboxylic acid, and derivatives thereof; and 4) a liquid crystal polyester resin synthesized mainly from a) one or more compounds selected from the group consisting of an aromatic hydroxycarboxylic acid and derivatives thereof, b) one or more compounds selected from the group consisting of an aromatic hydroxyamine, an aromatic diamine, and derivatives thereof, c) one or more compounds selected from the group consisting of an aromatic dicarboxylic acid, an alicyclic dicarboxylic acid, and derivatives thereof, and d) one or more compounds selected from the group consisting of an aromatic diol, an alicyclic diol, an aliphatic dial, and derivatives thereof. Preferred is a liquid crystal polyester-amide resin synthesized mainly from 1) one or more compounds selected from the group consisting of an aromatic hydroxycarboxylic acid and derivatives thereof.

Further, a molecular weight modifier may be used in combination with the above-mentioned constituent components, if necessary.

Preferred examples of the specific compound used in the synthesis of the liquid crystal polyester resin in the resin composition used in the present invention are naphthalene compounds such as 2,6-naphthalenedicarboxylic acid, 2,6-dihydroxynaphthalene, 1,4-dihydroxynaphthalene, and 6-hydroxy-2-naphthoic acid; biphenyl compounds such as 4,4'-diphenyldicarboxylic acid and 4,4'-dihydroxybiphenyl; para-substituted benzene compounds such as p-hydroxybenzoic acid, terephthalic acid, hydroquinone, p-aminophenol, and p-phenylenediamine, and nuclear-substituted benzene compounds thereof (substituent is selected from chlorine, bromine, methyl, phenyl, and 1-phenylethyl); meta-substituted benzene compounds such as isophthalic acid and resorcin; and compounds represented by the following general formulas (5), (6), and (7). Of these, p-hydroxybenzoic acid and 6-hydroxy-2-naphthoic acid are particularly preferable, and a liquid crystal polyester resin obtained by mixing both is preferable. The ratio of both is preferably in a range of 90 to 50 mol % for the former, and more preferably 80 to 65 mol %, and is preferably in a range of 10 to 50 mol % for the latter, and more preferably 20 to 35 mol %:

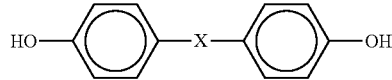

(5)

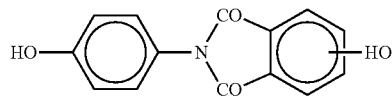

(6)

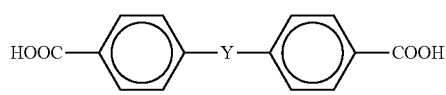

(7)

wherein X is a group selected from the group consisting of an alkylene group having 1 to 4 carbon atoms and an alkylidene group, —O—, —SO—, —SO$_2$—, —S— and —CO—, and Y is a group selected from the group consisting of —(CH$_2$)n- (n=1 to 4) and O(CH$_2$)nO— (n=1 to 4).

Further, in the liquid crystal polyester resin used in the present invention, a polyalkylene terephthalate-derived unit which does not partially exhibit an anisotropic molten phase may be present in the same molecular chain, in addition to the above-mentioned constituent components. The alkyl group in this case has 2 to 4 carbon atoms.

The basic method for producing a liquid crystal polyester resin used in the present invention is not particularly limited, and the liquid crystal polyester resin can be produced according to a known polycondensation method of the liquid crystal polyester resin. The liquid crystal polyester resin generally exhibits a logarithmic viscosity (IV value) of at least about 2.0 dl/g, for example, about 2.0 to 10.0 dl/g, when dissolved in pentafluorophenol at the concentration of 0.1% by weight at 60° C.

Due to the above properties, the liquid crystal polyester resin becomes a fine fibril form during injection molding, and the shape is maintained in the process of cooling and solidification to exert a reinforcing effect on the matrix. Therefore, it becomes possible to impart the tensile strength due to the liquid crystal polyester resin. There is also an effect that the injection speed and the resin pressure can be reduced by decreasing the viscosity of the resin composition due to the liquid crystal polyester resin.

The weight ratio of the aromatic polycarbonate-based resin (A) to the liquid crystal polyester resin (B) used in the present invention [(A)/(B)] is in a range of 98/2 to 60/40, preferably 95/5 to 70/30, more preferably 95/5 to 75/25, still more preferably 95/5 to 80/20, and yet more preferably 95/5 to 85/15. If the ratio of the liquid crystal polyester resin is more than this range, the tensile strength and flame retardancy deteriorate. Further, if the ratio of the liquid crystal polyester resin is less than this range, the effect of improving the tensile strength by mixing the liquid crystal polyester resin cannot be obtained.

(Component C: Halogenated Carbonate Compound)

As the halogenated carbonate compound used as the component C in the present invention, a halogenated carbonate compound, which includes a structural unit represented by the following general formula (8) accounting for at least 60 mol % of all the structural units, and has a specific viscosity of 0.015 to 0.1, is preferably used:

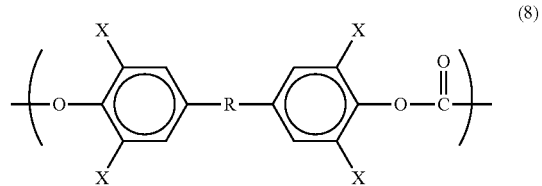

(8)

wherein, in the general formula (8), X is a bromine atom, and R is an alkylene group having 1 to 4 carbon atoms, an alkylidene group having 1 to 4 carbon atoms, or SO$_2$—.

In the general formula (8), R is preferably a methylene group, an ethylene group, an isopropylidene group, or —SO$_2$—, and particularly preferably an isopropylidene group.

The brominated polycarbonate contains a small amount of the residual chloroformate group terminal and has a terminal chlorine content of preferably 0.3 ppm or less, and more preferably 0.2 ppm or less. The terminal chlorine content can be determined by dissolving a sample in methylene chloride, adding 4-(p-nitrobenzyl)pyridine to react with terminal chlorine (terminal chloroformate) and measuring the terminal chlorine using an ultraviolet visible spectrophotometer (U-3200, manufactured by Hitachi, Ltd.). If the terminal chlorine content is 0.3 ppm or less, the heat stability of the polycarbonate resin composition is improved and high-temperature molding becomes possible, and thus a resin composition having more excellent moldability may be provided.

Further, the brominated polycarbonate preferably has few remaining hydroxyl group terminals. More specifically, the amount of terminal hydroxyl groups is preferably 0.0005 mol or less, and more preferably 0.0003 mol or less, based on 1 mol of the constituent unit of the brominated polycarbonate. The amount of the terminal hydroxyl groups can be determined by dissolving the sample in deuterated chloroform and measuring by $^1$H-NMR method. When the amount of the terminal hydroxyl groups falls within the above range, the heat stability of the polycarbonate resin composition may be further improved.

The specific viscosity of the brominated polycarbonate is preferably in a range of 0.015 to 0.1, and more preferably 0.015 to 0.08. The specific viscosity of the brominated polycarbonate was calculated according to the above-mentioned specific viscosity calculation formula used in calculating the viscosity-average molecular weight of the polycarbonate-based resin which is the component A of the present invention.

Further, such halogenated carbonate compound is commercially available, and examples thereof include a tetrabromobisphenol A carbonate oligomer (trade names of FG-7000 and FG-8500) manufactured by Teijin Limited, which can be used in the present invention.

The content of the component C is 3 to 40 parts by weight, preferably 5 to 30 parts by weight, and more preferably 10 to 30 parts by weight, based on 100 parts by weight of the total amount of the component A and the component B. If the content of the component C is less than 3 parts by weight, sufficient flame retardancy cannot be obtained, and if the content thereof is more than 40 parts by weight, the mechanical properties greatly deteriorate.

(Component D: Dripping Inhibitor)

The dripping inhibitor used as the component D in the present invention includes, for example, a fluorine-containing polymer having fibril forming ability. Examples of the polymer include polytetrafluoroethylene, tetrafluoroethylene-based copolymers (for example, tetrafluoroethylene/hexafluoropropylene copolymer), partially fluorinated polymers mentioned in U.S. Pat. No. 4,379,910, and polycarbonate resins produced from fluorinated diphenols. Of these, polytetrafluoroethylene (hereinafter sometimes referred to as "PTFE") is preferable.

PTFE having fibril forming ability has an extremely high molecular weight and tends to become fibrous through the bonding of PTFEs by an external function such as shearing force. The number-average molecular weight determined from standard specific gravity is preferably 1,000,000 to 10,000,000, and more preferably 2,000,000 to 9,000,000. PTFE in the form of an aqueous dispersion besides a solid may also be used. PTFE having fibril forming ability may be used as a mixture with other resins in order to improve the dispersibility in a resin and to obtain more satisfactory flame retardancy and mechanical properties.

Examples of commercially available products of PTFE having fibril forming ability include Teflon (registered trademark) 6-J manufactured by Chemours-Mitsui Fluoroproducts Co., Ltd. and Polyflon MPA FA500 and F-201 manufactured by Daikin Industries, Ltd. Typical examples of commercially available products of the aqueous dispersion of PTFE include Fluon D series manufactured by Daikin Industries, Ltd. and Teflon (registered trademark) 31-JR manufactured by Chemours-Mitsui Fluoroproducts Co., Ltd.

It is possible to use, as PTFE in a mixture form, those obtained by (1) a method in which an aqueous dispersion of PTFE and an aqueous dispersion or a solution of an organic polymer are mixed to carry out co-precipitation, thus obtaining a coaggregation mixture (method mentioned in JP 60-258263 A and JP 63-154744 A), (2) a method in which an aqueous dispersion of PTFE and dried organic polymer particles are mixed (method mentioned in JP 4-272957 A), (3) a method in which an aqueous dispersion of PTFE and an organic polymer particle solution are uniformly mixed and media thereof are simultaneously removed from the mixture (method mentioned in JP 06-220210 A and JP 08-188653 A), (4) a method in which a monomer forming an organic polymer is polymerized in an aqueous dispersion of PTFE (method mentioned in JP 9-95583 A), and (5) a method in which an aqueous dispersion of PTFE and a dispersion of an organic polymer are uniformly mixed and a vinyl-based monomer is polymerized in the mixed dispersion to obtain a mixture (method mentioned in JP 11-29679 A) may be used. Examples of commercially available products of PTFE in these mixture forms include "METABLEN A3800" (trade name) and "METABLEN A3750" (trade name) manufactured by Mitsubishi Chemical Corporation.

As for the ratio of PTFE in the mixture form, the content of PTFE is preferably 1 to 60% by weight, and more preferably 5 to 55% by weight, based on 100% by weight of the PTFE mixture. If the content of PTFE falls within the above range, satisfactory dispersibility of PTFE can be achieved.

Examples of the styrene-based monomer used in the organic polymer used in the polytetrafluoroethylene-based mixture include, but are not limited to, styrene, which may be substituted with at least one group selected from the group consisting of an alkyl group having 1 to 6 carbon atoms, an alkoxy group having 1 to 6 carbon atoms, and a halogen; for example, ortho-methylstyrene, meta-methylstyrene, para-methylstyrene, dimethylstyrene, ethyl-styrene, para-tert-butylstyrene, methoxystyrene, fluorostyrene, monobromostyrene, dibromostyrene, tribromostyrene, vinyl xylene, and vinyl naphthalene. The styrene-based monomers may be used alone, or in combination of two or more thereof.

The acrylic monomer used in the organic polymer used in the polytetrafluoroethylene-based mixture includes (meth)acrylate derivatives which may be substituted. Specific examples of the acrylic monomer include, but are not limited to, (meth)acrylate derivatives, which may be substituted by at least one group selected from the group consisting of an alkyl group having 1 to 20 carbon atoms, a cycloalkyl group having 3 to 8 carbon atoms, an aryl group, and a glycidyl group; for example, (meth)acrylonitrile, methyl (meth)acrylate, ethyl (meth)acrylate, propyl (meth)acrylate, butyl (meth)acrylate, amyl (meth)acrylate, hexyl (meth)acrylate, 2-ethylhexyl (meth)acrylate, cyclohexyl (meth)acrylate, octyl (meth)acrylate, dodecyl (meth)acrylate, phenyl (meth)acrylate, benzyl (meth)acrylate, and glycidyl (meth)acrylate; and maleimides, which may be substituted with an alkyl group having 1 to 6 carbon atoms or an aryl group; for example, maleimide, N-methyl-maleimide and N-phenyl-maleimide, maleic acid, phthalic acid, and itaconic acid. The acrylic monomers may be used alone, or in combination of two or more thereof. Of these, (meth)acrylonitrile is preferable.

The amount of the acrylic monomer derived unit contained in the organic polymer is preferably 8 to 11 parts by weight, more preferably 8 to 10 parts by weight, and still more preferably 8 to 9 parts by weight, based on 100 parts by weight of the styrene-based monomer derived unit. If the amount of the acrylic monomer derived unit is less than 8 parts by weight, the coating strength may degrade, and if the amount thereof is more than 11 parts by weight, the surface appearance of a molded article may deteriorate.

The polytetrafluoroethylene-based mixture has a residual water content of preferably 0.5% by weight or less, more preferably 0.2 to 0.4% by weight, and still more preferably 0.1 to 0.3% by weight. If the residual water content is more than 0.5% by weight, an adverse effect may be exerted on flame retardancy.

The production process of the polytetrafluoroethylene-based mixture of the present invention includes a step of forming a coating layer containing at least one monomer selected from the group consisting of a styrene-based monomer and an acrylic monomer in the presence of an initiator on the exterior of branched polytetrafluoroethylene. Preferably, the production process further includes a drying step for reducing the residual water content to preferably 0.5% by weight or less, more preferably 0.2 to 0.4% by weight, and still more preferably 0.1 to 0.3% by weight, after the step of forming the coating layer. The drying step may be carried out by using a method which is known in the industry, such as a hot air drying or vacuum drying method.

The initiator used for the polytetrafluoroethylene-based mixture is not particularly limited as long as it can be used in the polymerization reaction of a styrene-based and/or acrylic monomer. Examples of the initiator include, but are not limited to, cumyl hydroperoxide, di-tert-butyl peroxide, benzoyl peroxide, hydrogen peroxide, and potassium peroxide. At least one initiator may be used for the polytetrafluoroethylene-based mixture according to reaction conditions. The amount of the initiator is freely selected from a range within which it is used in consideration of the amount of polytetrafluoroethylene and the type and amount of the monomer, but is preferably 0.15 to 0.25 parts by weight based on the amount of the whole composition.

The polytetrafluoroethylene-based mixture of the present invention was produced by a suspension polymerization method based on the following procedure.

First, water and a branched polytetrafluoroethylene dispersion (solid content: 60%, polytetrafluoroethylene particle diameter: 0.15 to 0.3 μm) were charged in a reactor, and then an acrylic monomer, a styrene monomer, and cumene hydroperoxide as a water-soluble initiator were added to the mixture while stirring to carry out a reaction at 80 to 90° C. for 9 hours. After completion of the reaction, centrifugation was carried out by a centrifugal separator for 30 minutes to remove water, thus obtaining a pasty product. Thereafter, the pasty product was dried with a hot air drier at 80 to 100° C. for 8 hours. The dried product was ground to obtain a polytetrafluoroethylene-based mixture of the present invention.

Since the suspension polymerization method does not require a polymerization step which is carried out by emulsion dispersion in the emulsion polymerization method mentioned in JP 3469391 B1, an emulsifier and an electrolyte salt for solidifying and precipitating latex after polymerization are not required. Since the emulsifier and the electrolyte salt contained in the mixture tend to be coexistent in the polytetrafluoroethylene mixture produced by the emulsion polymerization method and are hardly removed, it is difficult to reduce the contents of sodium metal ions and potassium metal ions derived from the emulsifier and the electrolyte salt. The polytetrafluoroethylene-based mixture (component B) used in the present invention is produced by the suspension polymerization method, so that the emulsifier and the electrolyte salt are not used, thus making it possible to reduce the contents of sodium metal ions and potassium metal ions in the mixture and to improve the thermal stability and hydrolysis resistance.

Coated branched PTFE may be used as the dripping inhibitor in the present invention. The coated branched PTFE is a polytetrafluoroethylene-based mixture composed of branched polytetrafluoroethylene particles and an organic polymer and has a coating layer made of an organic polymer, preferably a polymer including a styrene-based monomer derived unit and/or an acrylic monomer derived unit, on the exterior of branched polytetrafluoroethylene. The coating layer is formed on the surface of branched polytetrafluoroethylene. Further, the coating layer preferably contains a copolymer of a styrene-based monomer and an acrylic monomer.

The polytetrafluoroethylene contained in the coated branched PTFE is branched polytetrafluoroethylene. When the contained polytetrafluoroethylene is not branched polytetrafluoroethylene, the dripping preventing effect becomes unsatisfactory if a small amount of polytetrafluoroethylene is added. The branched polytetrafluoroethylene is a particulate with a particle diameter of preferably 0.1 to 0.6 μm, more preferably 0.3 to 0.5 μm, and still more preferably 0.3 to 0.4 μm. If the particle diameter is less than 0.1 μm, a molded article has excellent surface appearance, but it is difficult to acquire commercially available polytetrafluoroethylene having a particle diameter of less than 0.1 μm. If the particle diameter is more than 0.6 μm, the surface appearance of a molded article may deteriorate. The number-average molecular weight of the polytetrafluoroethylene used in the present invention is preferably $1 \times 10^4$ to $1 \times 10^7$, and more preferably $2 \times 10^6$ to $9 \times 10^6$. In general, polytetrafluoroethylene having a high molecular weight is more preferable from the viewpoint of stability. It may be in a powder or dispersion form.

The content of the branched polytetrafluoroethylene in the coated branched PTFE is preferably 20 to 60 parts by weight, more preferably 40 to 55 parts by weight, still more preferably 47 to 53 parts by weight, particularly preferably 48 to 52 parts by weight, and most preferably 49 to 51 parts by weight, based on 100 parts by weight of the total weight of the coated branched PTFE. When the content of the branched polytetrafluoroethylene falls within the above range, satisfactory dispersibility of the branched polytetrafluoroethylene can be achieved.

The content of the component D is 0.1 to 3 parts by weight, preferably 0.15 to 2 parts by weight, and more preferably 0.5 to 1.5 parts by weight, based on 100 parts by weight of the total amount of the component A and the component B. If the content thereof is more than this range, the cost may increase and the extrudability may become insufficient. Meanwhile, if the content thereof is less than this range, the flame retardancy may be insufficient. The ratio of the component D indicates the net amount of the dripping inhibitor, and in the case of PTFE in a mixed form, indicates the net amount of PTFE.

(Component E: Glass Fiber and/or Carbon Fiber)

The glass fiber used as the component E in the present invention preferably includes a glass fiber having a circular cross-section, a glass fiber having a flat cross-section in which an average value of the major axis of the fiber cross-section is 10 to 50 μm and an average value of a ratio of the major axis to the minor axis (major axis/minor axis) is 1.5 to 8, and a glass milled fiber. In particular, a glass fiber having a flat cross-section in which an average value of the major axis of the fiber cross-section is 10 to 50 μm and an average value of a ratio of the major axis to the minor axis (major axis/minor axis) is 1.5 to 8 is more preferable in view of tensile strength and dimensional accuracy. The average value of the fiber cross-section of the glass fiber having a flat cross-section is preferably 15 to 40 μm, more preferably 15 to 35 μm, and still more preferably 20 to 35 μm. The average value of a ratio of the major axis to the minor axis (major axis/minor axis) is preferably 2 to 6, more preferably 2 to 5, and still more preferably 2.5 to 5. Examples of other flat cross-sectional shapes include, in addition to a flat shape, an elliptical, eyebrow-shaped, and trifoliate cross-sections as well as non-circular cross-sectional shapes similar thereto. Of these, a flat shape is preferably in view of an improvement in mechanical strength and low anisotropy.

As for the glass composition of the glass fibers, various types of glass typified by A-glass, C-glass, and E-glass may be used and not particularly limited. This glass fiber may contain a component such as $TiO_2$, $SO_3$, and $P_2O_5$ as required. Of these, E-glass (non-alkali glass) is more preferable. These glass fibers are preferably subjected to a surface treatment with a known surface treating agent such as a silane coupling agent, a titanate coupling agent, or an aluminate coupling agent in view of an improvement in mechanical strength. They are also preferably sized with an olefinic resin, a styrene-based resin, an acrylic resin, a polyester-based resin, an epoxy-based resin or a urethane-based resin, of which the epoxy-based resin and the urethane-based resin are particularly preferred in view of mechanical strength. The deposition amount of the sizing agent of the glass fiber subjected to a sizing treatment is preferably 0.1 to 3% by weight, and more preferably 0.2 to 1% by weight, based on 100% by weight of the glass fiber.

Examples of the carbon fiber used as the component E in the present invention include carbon fibers such as metal-coated carbon fibers, carbon milled fibers, and vapor grown carbon fibers and carbon nanotubes. The carbon nanotubes preferably have a fiber diameter of 0.003 to 0.1 μm, and may consist of a single layer, two layers, or multiple layers, preferably multiple layers (so-called MWCNT). Of these, carbon fibers are preferable in view of excellent mechanical strength.

It is possible to use, as the carbon fiber, any of cellulosic-based, polyacrylonitrile-based, and pitch-based carbon fibers. It is also possible to use those obtained by a method of spinning without subjecting to an infusibilization step, typified by a method in which a raw material composition composed of a polymer and a solvent by a methylene type bond of aromatic sulfonic acids or salts thereof is spun or molded, followed by carbonization. It is also possible to use any of a generic type, medium elastic modulus type, and high elastic modulus type carbon fibers. Of these, a polyacrylonitrile-based high elastic modulus type carbon fiber is particularly preferable.

Further, the surface of the carbon fiber is preferably oxidized for the purpose of enhancing the adhesion with the matrix resin and improving the mechanical strength. Examples of the oxidation treatment method include, but are not limited to, (1) a method in which carbon fibers are treated with an acid or an alkali or a salt thereof, or an oxidizing gas; (2) a method in which fibers that can be converted into carbon fibers or carbon fibers are fired at a temperature of 700° C. or higher in the presence of an inert gas containing an oxygen-containing compound; and (3) a method in which carbon fibers are subjected to an oxidization treatment, followed by a heat treatment in the presence of an inert gas.

Metal-coated carbon fiber is a carbon fiber coated with a metal layer on the surface. Examples of the metal include silver, copper, nickel, and aluminum, and nickel is preferable in view of corrosion resistance of the metal layer. Examples of the metal coating method include known methods such as a plating method and a vapor deposition method, and of these, the plating method is preferably used. Further, in the case of such a metal-coated carbon fiber, the carbon fiber mentioned above can also be used as the original carbon fiber. The thickness of the metal coating layer is preferably 0.1 to 1 μm, more preferably 0.15 to 0.5 μm, and still more preferably 0.2 to 0.35 μm.

The carbon fiber and the metal-coated carbon fiber are preferably those subjected to a sizing treatment with an olefinic resin, a styrene-based resin, an acrylic resin, a polyester-based resin, an epoxy-based resin, and a urethane-based resin. In particular, the carbon fiber treated with the urethane-based resin or the epoxy-based resin is preferable in the present invention because of excellent mechanical strength.

The content of the component E is 25 to 150 parts by weight, preferably 30 to 140 parts by weight, and more preferably 40 to 120 parts by weight, based on 100 parts by weight of the total amount of the component A and the component B. If the content of the component E is less than 25 parts by weight, an improvement in tensile strength becomes insufficient. Meanwhile, if the content thereof is more than 150 parts by weight, the strength and flame retardancy deteriorate.

(Component F: Epoxy Resin)

Examples of the epoxy resin used as the component F in the present invention include an epoxy resin represented by the following general formula (9):

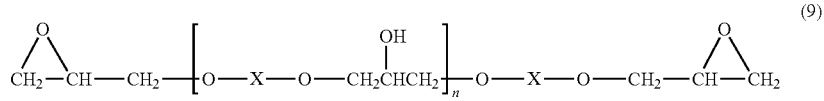

wherein X is at least one group selected from the group consisting of groups represented by the following general formula (10), and n is an integer of 0 or greater:

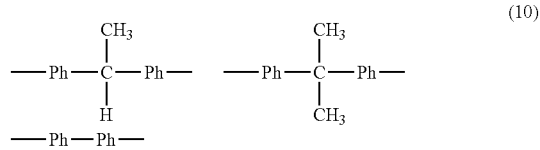

wherein Ph represents a phenyl group.

The epoxy resin represented by the above formula (9) can be easily produced from dihydric phenols and epichlorohydrin. It is possible to use, as the dihydric phenols, bisphenol A type epoxy resins such as 2,2-bis(4-hydroxyphenyl)propane [bisphenol A], 1,1-bis(4-hydroxyphenyl)ethane, or 4,4'-dihydroxybiphenyl.

It is also possible to use, as the epoxy resin, commercially available products. Examples of commercially available products of the epoxy resin (bisphenol A type) include jER1256 (manufactured by Mitsubishi Chemical Corporation, Mw=50,000).

The weight-average molecular weight of the epoxy resin is not particularly limited, but is usually 5,000 to 100,000, preferably 8,000 to 80,000, and more preferably 10,000 to 50,000. If the weight-average molecular weight is in a range of 5,000 to 100,000, the mechanical properties are particularly satisfactory.

The epoxy equivalent of the epoxy resin is not particularly limited, but is usually 100 to 12,000, preferably 150 to 10,000, and more preferably 200 to 8,000. If the epoxy equivalent is in a range of 100 to 12,000, the mechanical properties are particularly satisfactory.

The content of the component F is 0.1 to 8 parts by weight, preferably 1 to 7 parts by weight, and more preferably 3 to 6 parts by weight, based on 100 parts by weight of the total amount of the component A and the component B. If the content is less than 0.1 parts by weight, the tensile strength decreases. On the other hand, if the content is more than 8 parts by weight, the flame retardance is poor and the tensile strength decreases.

(Component G: Phosphorus-Based Stabilizer)

In the present invention, in order to more effectively exert the effect of improving the mechanical properties by fiberizing the liquid crystal polyester resin of the component B during injection molding, it is efficient that the liquid crystal polyester resin is micro-dispersed in a matrix phase in advance. Therefore, it is necessary to add a phosphorus-based stabilizer, which is the component G, as a dispersion aid for the liquid crystal polyester resin to be micro-dispersed in the matrix phase. As the phosphorus-based stabilizer, a phosphate compound having a molecular weight of less than 300 is preferable. If the molecular weight is 300 or more, the dispersion in the resin deteriorates, and the effect as a stabilizer may be lowered. Specifically, trimethyl phosphate is exemplified. Esters of phosphite are also preferable, and specific examples thereof include tetrakis(2,4-di-t-butylphenyl)-4,4'-biphenylene phosphonite, bis(2,6-di-t-butyl-4-methylphenyl)pentaerythritol-diphosphite, bis(2,4-di-t-butylphenyl)pentaerythritol-diphosphite, and tris(2,4-di-t-butylphenyl)phosphite. These phosphorus-based stabilizers may be added alone or in combination. The content of the component G is 0.01 to 3 parts by weight, preferably 0.01 to 1 part by weight, and more preferably 0.02 to 0.1 parts by weight, based on 100 parts by weight of the total amount of the component A and the component B. If the content of the component G is more than 3 parts by weight, a large amount of volatile gas is generated during extrusion, and a mold deposit is generated during molding even when pelletized. It also tends to be disadvantageous in view of cost. If the content thereof is less than 0.01 part by weight, the thermal stability deteriorates and the tensile strength peculiar to this composition is not exhibited.

Other Additives

It is also possible to mix the resin composition of the present invention with other thermoplastic resins (for example, a polyarylate resin, a fluororesin, or a polyester resin), antioxidants (for example, a hindered phenol-based compound), impact modifiers, ultraviolet absorbers, light stabilizers, mold release agents, lubricants, colorants, inorganic fillers (talc, mica, etc.), etc. as long as the object of the present invention is not impaired.

Any optional methods may be used for producing the resin composition of the present invention. Examples thereof include a method in which each component and other optional components are premixed and then the mixture is melt-kneaded and pelletized. Examples of premixing means include a Nauta mixer, a V-type blender, a Henschel mixer, a mechanochemical device, and an extrusion mixer. In the premixing step, as necessary, an extrusion granulator or briquetting machine may be used for carrying out granulation. After the premixing step, melt-kneading is carried out by a melt kneader typified by a vented twin-screw extruder and pelletization is carried out by equipment such as a pelletizer. Examples of other melt-kneaders include a Banbury mixer, a kneading roll, and a temperature-controlled stirring vessel, but the vented twin-screw extruder is preferable. Other than the above methods, it is also possible to use a method in which each component and other optional components are each independently fed into a melt-kneader typified by a twin-screw extruder, without subjecting to premixing.

An impeller can be usually produced by injection molding of the pellet of the resin composition of the present invention obtained as mentioned above. It is possible to obtain molded articles by using, in addition to ordinary molding methods, injection molding methods such as injection compression molding, injection press molding, gas-assisted injection molding, foam molding (including a method of injecting a supercritical fluid), insert molding, in-mold coating molding, insulated die molding, rapid heating/cooling die molding, two-color molding, sandwich molding, and ultrahigh-speed injection molding as appropriate according to purposes. The advantages of these various molding methods are already widely known. It is also possible to select, as a molding system, either of a cold runner system and a hot runner system.

The impeller of the present invention can have various shapes, and can be, for example, an impeller for cooling, ventilation, air conditioning fan of home appliances, OA equipment, and industrial equipment, and vehicle air conditioning, and blower fan.

The impeller of the present invention has high tensile strength, specific strength, dimensional accuracy, and flame retardancy in a high-temperature environment. Specifically, when a test piece having a thickness of 2 mm is tested at a tensile speed of 5 mm/min at 85° C., it exhibits a tensile strength of 125 MPa or more, and preferably 130 MPa or more. The specific strength (kN·m/kg) calculated by the tensile strength (MPa)/density ($kg/m^3$) is 75 or more, and preferably 80 or more. The dimensional accuracy is such that the dimensional change rate in the vertical direction of a blade tip to the diameter after rotating at 12,000 rpm for 10 days in an atmosphere of 85° C. is 0.4% or less, and preferably 0.35% or less. The flame retardancy indicates V-0 when a V test (vertical burning test) at a thickness of 0.8 mm is carried out in accordance with UL94 using a test piece.

The form of the invention that the present inventors consider to be the best at present is a collection of preferable ranges of each of the above requirements and, for example, representative examples thereof will be described in the following examples. Of course, the present invention is not limited to these forms.

EXAMPLES

The present invention will be further described below by way of examples. The evaluation was carried out by the following methods.

(Evaluation of Impeller and Resin Composition Therefor)
    (i) Density: A tensile test piece obtained by the following method was cut into a size of 10 mm in width×80 mm in length×4 mm in thickness. Using the test piece, the density in an environment at 23° C. was measured by an electronic gravimeter MD-200S manufactured by Mirage Trading Co., Ltd.

(ii) Tensile strength: Using the tensile test piece obtained by the following method, the tensile strength was measured (tensile speed: 5 mm/min, test temperature: 23° C. and 85° C.).

(iii) Specific strength: The value calculated below was regarded as the specific strength.

Specific strength (kN·m/kg)=tensile strength (MPa)/density (kg/m$^3$)

(iv) Mold shrinkage factor: A square plate having a width of 50 mm, a length of 100 mm, and a thickness of 2 mm obtained by the following method was left to stand in an atmosphere at 23° C. and a relative humidity of 50% for 24 hours, and then square plate sizes were measured by a coordinate measuring machine (manufactured by Mitutoyo Corporation) to calculate a mold shrinkage factor. The molded article is obtained by molding using a mold cavity having a film gate at one end in the length direction. Therefore, the length direction is the flow direction, and the width direction is the direction perpendicular to the flow direction.

(v) Flame retardancy

A V test (vertical burning test) at a thickness of 0.8 mm was carried out in accordance with UL94 using a UL test piece obtained by the following method.

(vi) Extrudability

The stability during extrusion was evaluated according to the following criteria.

Strands are stable during extrusion: A

Strands during extrusion are slightly unstable, but pelletization is possible: B Strands during extrusion are considerably unstable, and it is difficult to pelletize or there is a lot of volatile gas: C (vii) Properties of Impeller As for the impeller (total length L: 120 mm) obtained by the following method, after rotation at 12,000 rpm in an atmosphere at 85° C. for 10 days, the displacement amount of the part a was measured by a laser displacement sensor, and the evaluation was carried out according to the following criteria.

Dimensional change after test is 0.5 mm or less: A

Dimensional change after test is 0.5 mm or more, or the molded article has cracks: C Examples 1 to 16, Comparative Examples 1 to 12

According to the formulations shown in Tables 1 and 2, each of the mixtures composed of components excluding the component E was supplied through a first supply port of an extruder. Such a mixture was obtained by mixing using a V-type blender. The component E was supplied through a second supply port using a side feeder. Using a vented twin-screw extruder having a diameter of 30 mmφ (TEX30α-38.5BW-3V, manufactured by The Japan Steel Works, Ltd.), the mixture was extruded at a screw rotation speed of 200 rpm, a discharge rate of 25 kg/h, and a vent vacuum level of 3 kPa to obtain pellets. The extrusion was carried out at an extrusion temperature of 300° C. from the first supply port to a die portion.

A part of the pellets thus obtained was dried by a hot air circulation type dryer at 120° C. for 6 hours, and then a tensile test piece having a thickness of 2 mm (JIS K6251 dumbbell-shaped No. 3 type), a test piece for the measurement of mold shrinkage rate, and a UL test piece were molded at a cylinder temperature of 300° C. and a mold temperature of 80° C. using an injection molding machine.

Using a part of pellets, an impeller shown in FIG. 1 was molded by an injection molding machine at a cylinder temperature of 300° C. and a mold temperature of 100° C.

The components of the symbolic notation in Tables 1 and 2 are as follows.

(Component A)

A-1: Aromatic polycarbonate resin (polycarbonate resin powder having a viscosity-average molecular weight of 22,400 made from bisphenol A and phosgene by a conventional method, Panlite L-1225WP (product name) manufactured by Teijin Limited)

A-2: Aromatic polycarbonate resin (polycarbonate resin powder having a viscosity-average molecular weight of 19,700 made from bisphenol A and phosgene by a conventional method, Panlite L-1225WX (product name) manufactured by Teijin Limited)

A-3: Aromatic polycarbonate resin (polycarbonate resin powder having a viscosity-average molecular weight of 16,000 made from bisphenol A and phosgene by a conventional method, Panlite CM-1000 (product name) manufactured by Teijin Limited)

A-4: Aromatic polycarbonate resin (polycarbonate resin powder having a viscosity-average molecular weight of 25,100 made from bisphenol A and phosgene by a conventional method, Panlite L-1250WQ (product name) manufactured by Teijin Limited)

(Component B)

B-1: Liquid crystal polyester resin (liquid crystal polyester resin pellets including a repeating unit derived from p-hydroxybenzoic acid and a repeating unit derived from 6-hydroxy-2-naphthoic acid, LAPEROS A-950RX (product name) manufactured by Polyplastics Co., Ltd.) Melting point=275 to 285° C.)

(Component C)

C-1: Halogenated carbonate compound (brominated carbonate oligomer including a bisphenol A skeleton, FIRE GUARD FG-7000 (product name) manufactured by Teijin Limited)

(Component D)

D-1: Dripping inhibitor (polytetrafluoroethylene (POLYFLON MPA FA-500H (trade name) manufactured by DAIKIN INDUSTRIES, Ltd.))

(Component E)

E-1: Glass fiber: Chopped glass fiber having a flat cross-section (CSG 3PA-830 (product name) manufactured by Nitto Boseki Co., Ltd., major axis of 28 µm, minor axis of 7 µm, cut length of 3 mm, epoxy-based sizing agent)

E-2: Carbon fiber: PAN-based carbon fiber (HTC422 (product name) manufactured by Teijin Limited, fiber diameter of 7 µm, cut length of 6 mm, urethane-based sizing agent)

E-3: Glass fiber: Chopped glass fiber having a flat cross-section (CSG 3PL-830 (product name) manufactured by Nitto Boseki Co., Ltd., major axis of 20 µm, minor axis of 10 µm, cut length of 3 mm, epoxy-based sizing agent)

(Component F)

F-1: Bisphenol A type epoxy resin (jER1256 (trade name) manufactured by Mitsubishi Chemical Corporation, epoxy equivalent of 75,000 to 8,000 g/eq, weight-average molecular weight of 50,000)

(Component G)

G-1: Phosphorus-based stabilizer (trimethyl phosphate (TMP) manufactured by DAIHACHI CHEMICAL INDUSTRY CO., LTD.)

G-2: Phosphorus-based stabilizer (bis(2,4-di-t-butylphenyl)pentaerythritol diphosphate (SONGNOX 6260PW)) manufactured by Songwon International Japan K.K.)
G-3: Phosphorus-based stabilizer (tris(2,4-di-t-butylphenyl)phosphite (ADEKA STUB 2112) manufactured by ADEKA Corporation)

Other Components

Mold release agent-1: Rikemar SL-900 (manufactured by RIKEN VITAMIN Co., Ltd., main component: stearyl stearate)
Mold release agent-2: Licowax E powder (manufactured by Clariant Japan K.K.)

Colorant: Carbon black master pellets produced by melt mixing of 100 parts by weight of the total amount of four components: 40 parts by weight of carbon black (carbon black MA-100 (trade name) manufactured by Mitsubishi Chemical Corporation), 3 parts by weight of white mineral oil (Primol N 382 (trade name) manufactured by Exxon Mobile Corporation), 0.2 part by weight of a montanic acid ester wax (Licowax E powder (trade name) manufactured by Clariant Japan K.K.), and 56.8 parts by weight of bisphenol A type polycarbonate resin (CM-1000 (trade name) manufactured by Teijin Limited, viscosity-average molecular weight of 16,000) using a twin-screw extruder.

TABLE 1

|  |  |  | Example |  |  |  |  |  |  |  |
|---|---|---|---|---|---|---|---|---|---|---|
| Items |  |  | 1 | 2 | 3 | 4 | 5 | 6 | 7 | 8 |
| Composition | A-1 | Parts by weight | 95 | 95 | 85 | 85 | 75 | 75 | 65 |  |
|  | A-2 | Parts by weight |  |  |  |  |  |  |  | 85 |
|  | A-3 | Parts by weight |  |  |  |  |  |  |  |  |
|  | A-4 | Parts by weight |  |  |  |  |  |  |  |  |
|  | B-1 | Parts by weight | 5 | 5 | 15 | 15 | 25 | 25 | 35 | 15 |
|  | Total | Parts by weight | 100 | 100 | 100 | 100 | 100 | 100 | 100 | 100 |
|  | C-1 | Parts by weight | 25 | 25 | 25 | 25 | 25 | 25 | 25 | 25 |
|  | D-1 | Parts by weight | 1 | 1 | 1 | 1 | 1 | 1 | 1 | 1 |
|  | E-1 | Parts by weight | 110 | 110 | 110 | 110 | 110 | 110 | 110 | 110 |
|  | E-2 |  |  |  |  |  |  |  |  |  |
|  | E-3 |  |  |  |  |  |  |  |  |  |
|  | F-1 | Parts by weight | 5 | 5 | 5 | 5 | 5 | 5 | 5 | 5 |
|  | G-1 | Parts by weight | 0.1 | 0.1 | 0.1 | 0.1 | 0.1 | 0.1 | 0.1 | 0.1 |
|  | G-2 |  |  |  |  |  |  | 0.1 |  |  |
|  | G-3 |  |  |  |  |  |  |  |  |  |
|  | Mold release agent-1 | Parts by weight | 1 |  | 1 |  | 1 | 1 | 1 | 1 |
|  | Mold release agent-2 |  |  |  |  |  |  |  |  |  |
|  | Colorant | Parts by weight | 1 |  | 1 |  | 1 | 1 | 1 | 1 |
| Evaluation results | Density | kg/m$^3$ | 1,630 | 1,630 | 1,640 | 1,640 | 1,650 | 1,650 | 1,660 | 1,640 |
|  | Tensile strength (23° C.): 2 mmt | MPa | 169 | 169 | 171 | 170 | 168 | 170 | 168 | 180 |
|  | Specific strength (23° C.): 2 mmt | kN · m/kg | 104 | 104 | 104 | 104 | 102 | 103 | 101 | 110 |
|  | Tensile strength (85° C.): 2 mmt | MPa | 132 | 130 | 132 | 130 | 132 | 133 | 132 | 143 |
|  | Specific strength (85° C.): 2 mmt | kN · m/kg | 81 | 80 | 80 | 79 | 80 | 81 | 80 | 87 |
|  | Flame retardancy (0.8 mm/V) | — | V-0 | V-0 | V-0 | V-0 | V-0 | V-0 | V-0 | V-0 |
|  | Mold shrinkage factor (%) | Flow direction | 0.16 | 0.16 | 0.16 | 0.16 | 0.15 | 0.15 | 0.15 | 0.14 |
|  |  | Perpendicular direction | 0.31 | 0.31 | 0.30 | 0.30 | 0.32 | 0.33 | 0.33 | 0.30 |
|  | Extrudability | — | A | A | A | A | A | A | A | A |
|  | Properties of impeller product |  | A | A | A | A | A | A | A | A |

|  |  |  | Example |  |  |  |  |  |  |  |
|---|---|---|---|---|---|---|---|---|---|---|
| Items |  |  | 9 | 10 | 11 | 12 | 13 | 14 | 15 | 16 |
| Composition | A-1 | Parts by weight |  |  |  |  |  | 85 | 95 | 85 |
|  | A-2 | Parts by weight | 80 | 75 | 75 |  |  |  |  |  |
|  | A-3 | Parts by weight |  |  |  | 85 |  |  |  |  |
|  | A-4 | Parts by weight |  |  |  |  | 85 |  |  |  |
|  | B-1 | Parts by weight | 20 | 25 | 25 | 15 | 15 | 15 | 5 | 15 |
|  | Total | Parts by weight | 100 | 100 | 100 | 100 | 100 | 100 | 100 | 100 |
|  | C-1 | Parts by weight | 25 | 25 | 25 | 25 | 25 | 20 | 25 | 25 |
|  | D-1 | Parts by weight | 1 | 1 | 1 | 1 | 1 | 1 | 1 | 1 |
|  | E-1 | Parts by weight | 110 | 110 | 110 | 110 | 110 |  |  |  |
|  | E-2 |  |  |  |  |  |  | 55 |  |  |
|  | E-3 |  |  |  |  |  |  |  | 110 | 110 |
|  | F-1 | Parts by weight | 5 | 5 | 5 | 5 | 5 | 5 | 5 | 5 |
|  | G-1 | Parts by weight | 0.1 | 0.1 | 0.1 | 0.1 | 0.1 | 0.1 | 0.1 | 0.1 |

TABLE 1-continued

|  |  |  |  |  |  |  |  |  |  |
|---|---|---|---|---|---|---|---|---|---|
|  | G-2 |  | 0.1 | 0.1 | 0.1 |  |  | 0.1 | 0.1 |
|  | G-3 |  |  | 0.1 | 0.1 |  |  |  |  |
|  | Mold release agent-1 | Parts by weight |  | 1 |  | 1 | 1 | 1 |  |
|  | Mold release agent-2 |  | 1 |  | 1 |  |  | 1 | 1 |
|  | Colorant | Parts by weight | 1 | 1 | 1 | 1 | 1 | 1 | 1 | 1 |
| Evaluation results | Density | kg/m³ | 1,650 | 1,650 | 1,650 | 1,640 | 1,640 | 1,390 | 1,630 | 1,640 |
|  | Tensile strength (23° C.): 2 mmt | MPa | 180 | 181 | 182 | 165 | 166 | 180 | 170 | 172 |
|  | Specific strength (23° C.): 2 mmt | kN · m/kg | 109 | 110 | 110 | 101 | 101 | 129 | 104 | 105 |
|  | Tensile strength (85° C.): 2 mmt | MPa | 145 | 145 | 145 | 125 | 127 | 137 | 134 | 136 |
|  | Specific strength (85° C.): 2 mmt | kN · m/kg | 88 | 88 | 88 | 76 | 77 | 99 | 82 | 83 |
|  | Flame retardancy (0.8 mm/V) | — | V-0 | V-0 | V-0 | V-0 | V-0 | V-0 | V-0 | V-0 |
|  | Mold shrinkage factor (%) | Flow direction | 0.14 | 0.14 | 0.14 | 0.14 | 0.16 | 0.02 | 0.17 | 0.16 |
|  |  | Perpendicular direction | 0.30 | 0.30 | 0.30 | 0.29 | 0.31 | 0.48 | 0.32 | 0.31 |
|  | Extrudability | — | A | A | A | A | A | A | A | A |
|  | Properties of impeller product |  | A | A | A | A | A | A | A | A |

TABLE 2

|  |  |  | Comparative Example |  |  |  |  |  |
|---|---|---|---|---|---|---|---|---|
| Items |  |  | 1 | 2 | 3 | 4 | 5 | 6 |
| Composition | A-1 | Parts by weight | 100 | 45 | 85 | 85 | 85 | 85 |
|  | B-1 | Parts by weight |  | 55 | 15 | 15 | 15 | 15 |
|  | Total | Parts by weight | 100 | 100 | 100 | 100 | 100 | 100 |
|  | C-1 | Parts by weight | 25 | 25 |  | 50 | 25 | 25 |
|  | D-1 | Parts by weight | 1 | 1 | 1 | 1 |  | 4 |
|  | E-1 | Parts by weight | 110 | 110 | 110 | 110 | 110 | 110 |
|  | F-1 | Parts by weight | 5 | 5 | 5 | 5 | 5 | 5 |
|  | G-1 | Parts by weight | 0.1 | 0.1 | 0.1 | 0.1 | 0.1 | 0.1 |
|  | Mold release agent-1 | Parts by weight | 1 | 1 | 1 | 1 | 1 | 1 |
|  | Colorant | Parts by weight | 1 | 1 | 1 | 1 | 1 | 1 |
| Evaluation results | Density | kg/m³ | 1,630 | 1,710 | 1,620 | 1,680 | 1,640 | Extrudability (no good) Not evaluated |
|  | Tensile strength (23° C.): 2 mmt | MPa | 158 | 155 | 170 | 150 | 170 |  |
|  | Specific strength (23° C.): 2 mmt | kN · m/kg | 97 | 91 | 105 | 89 | 104 |  |
|  | Tensile strength (85° C.): 2 mmt | MPa | 122 | 120 | 131 | 115 | 132 |  |
|  | Specific strength (85° C.): 2 mmt | kN · m/kg | 75 | 70 | 81 | 68 | 80 |  |
|  | Flame retardancy (0.8 mm/V) | — | V-0 | V-1 | Not-V | V-0 | Not-V |  |
|  | Mold shrinkage factor (%) | Flow direction | 0.16 | 0.15 | 0.13 | 0.14 | 0.15 |  |
|  |  | Perpendicular direction | 0.30 | 0.32 | 0.30 | 0.30 | 0.30 |  |
|  | Extrudability | — | A | A | A | A | A | C |
|  | Properties of impeller product |  | C | C | A | C | A | — |

|  |  |  | Comparative Example |  |  |  |  |  |
|---|---|---|---|---|---|---|---|---|
| Items |  |  | 7 | 8 | 9 | 10 | 11 | 12 |
| Composition | A-1 | Parts by weight | 85 | 85 | 85 | 85 | 85 | 85 |
|  | B-1 | Parts by weight | 15 | 15 | 15 | 15 | 15 | 15 |
|  | Total | Parts by weight | 100 | 100 | 100 | 100 | 100 | 100 |
|  | C-1 | Parts by weight | 25 | 25 | 25 | 25 | 25 | 25 |
|  | D-1 | Parts by weight | 1 | 1 | 1 | 1 | 1 | 1 |
|  | E-1 | Parts by weight | 20 | 170 | 110 | 110 | 110 | 110 |
|  | F-1 | Parts by weight | 5 | 5 |  | 10 | 5 | 5 |
|  | G-1 | Parts by weight | 0.1 | 0.1 | 0.1 | 0.1 |  | 4 |
|  | Mold release agent-1 | Parts by weight | 1 | 1 | 1 | 1 | 1 | 1 |

TABLE 2-continued

|  | Colorant | Parts by weight | 1 | 1 | 1 | 1 | 1 | 1 |
|---|---|---|---|---|---|---|---|---|
| Evaluation results | Density | kg/m³ | 1,410 | 1,770 | 1,670 | 1,650 | 1,660 | Extrudability (no good) Not evaluated |
|  | Tensile strength (23° C.): 2 mmt | MPa | 130 | 160 | 150 | 158 | 158 | |
|  | Specific strength (23° C.): 2 mmt | kN · m/kg | 92 | 90 | 90 | 96 | 95 | |
|  | Tensile strength (85° C.): 2 mmt | MPa | 97 | 120 | 112 | 118 | 118 | |
|  | Specific strength (85° C.): 2 mmt | kN · m/kg | 69 | 68 | 67 | 72 | 71 | |
|  | Flame retardancy (0.8 mm/V) | — | V-0 | Not-V | V-0 | Not-V | V-0 | |
|  | Mold shrinkage factor (%) | Flow direction | 0.15 | 0.12 | 0.15 | 0.15 | 0.14 | |
|  |  | Perpendicular direction | 0.30 | 0.28 | 0.32 | 0.33 | 0.30 | |
|  | Extrudability | — | A | B | A | A | A | C |
|  | Properties of impeller product |  | C | C | C | C | C | — |

As is apparent from Tables 1 and 2 above, according to the formulation of the present invention, an impeller made of the resin composition which is excellent in tensile strength and specific strength at high temperature and has low anisotropy of mold shrinkage rate and high dimensional accuracy, and which is also excellent in flame retardancy, has excellent strength at high temperature, exhibits little dimensional change, and has excellent properties.

REFERENCE SIGNS LIST

AX: Impeller central axis
CD: Rotational direction
1: Fan
2: Rotor holder
3: Impeller
a: Displacement amount measurement point
L: Impeller product overall length

The invention claimed is:

1. An impeller made of a resin composition comprising:
(A) an aromatic polycarbonate-based resin (component A),
(B) a liquid crystal polyester resin (component B), and based on 100 parts by weight of the total amount of the component A and the component B:
(C) 3 to 40 parts by weight of a halogenated carbonate compound (component C),
(D) 0.1 to 3 parts by weight of a dripping inhibitor (component D),
(E) 25 to 150 parts by weight of a glass fiber and/or a carbon fiber (component E),
(F) 0.1 to 8 parts by weight of an epoxy resin (component F), and
(G) 0.01 to 3 parts by weight of a phosphorus-based stabilizer (component G), wherein a weight ratio of the component A to the component B [(A)/(B)] is 98/2 to 60/40.

2. The impeller according to claim 1, wherein the component A has a viscosity-average molecular weight of $1.7 \times 10^4$ to $2.1 \times 10^4$.

3. The impeller according to claim 1, wherein the component B is a liquid crystal polyester resin including a repeating unit derived from p-hydroxybenzoic acid and a repeating unit derived from 6-hydroxy-2-naphthoic acid.

4. The impeller according to claim 1, wherein the component E is a glass fiber having a flat cross-section in which an average value of a major axis of a cross-section of the fiber is 10 to 50 μm and an average value of a ratio of the major axis to a minor axis (major axis/minor axis) is 1.5 to 8.

5. The impeller according to claim 1, wherein the component F is a bisphenol A type epoxy resin.

6. The impeller according to claim 1, wherein a dimensional change rate in the vertical direction of a blade tip to a diameter after being rotated at 12,000 rpm for 10 days in an atmosphere at 85° C. is 0.4% or less.

7. The impeller according to claim 1, which is used as an impeller for cooling, ventilation, air conditioning fan of home appliances, OA equipment, and industrial equipment, and vehicle air conditioning, and blower fan.

8. A resin composition comprising:
(A) an aromatic polycarbonate-based resin (component A),
(B) a liquid crystal polyester resin (component B), and based on 100 parts by weight of the total amount of the component A and the component B:
(C) 3 to 40 parts by weight of a halogenated carbonate compound (component C),
(D) 0.1 to 3 parts by weight of a dripping inhibitor (component D),
(E) 25 to 150 parts by weight of a glass fiber and/or a carbon fiber (component E),
(F) 0.1 to 8 parts by weight of an epoxy resin (component F), and
(G) 0.01 to 3 parts by weight of a phosphorus-based stabilizer (component G), wherein a weight ratio of the component A to the component B [(A)/(B)] is 98/2 to 60/40.

* * * * *